US012458599B2

(12) United States Patent
Fritz et al.

(10) Patent No.: US 12,458,599 B2
(45) Date of Patent: Nov. 4, 2025

(54) BIOACTIVATABLE DEVICES AND RELATED METHODS

(71) Applicant: CTI Vascular AG, Neuhausen (CH)

(72) Inventors: Ulf Fritz, Bargen (CH); Marc Gianotti, Wiesendangen (CH)

(73) Assignee: CTI Vascular AG, Neuhausen (CH)

( * ) Notice: Subject to any disclaimer, the term of this patent is extended or adjusted under 35 U.S.C. 154(b) by 0 days.

(21) Appl. No.: 18/248,025

(22) PCT Filed: Sep. 30, 2021

(86) PCT No.: PCT/EP2021/076987
§ 371 (c)(1),
(2) Date: Apr. 5, 2023

(87) PCT Pub. No.: WO2022/073850
PCT Pub. Date: Apr. 14, 2022

(65) Prior Publication Data
US 2023/0270680 A1    Aug. 31, 2023

Related U.S. Application Data

(60) Provisional application No. 63/088,534, filed on Oct. 7, 2020.

(51) Int. Cl.
*A61K 9/16* (2006.01)
*A61K 33/04* (2006.01)
(Continued)

(52) U.S. Cl.
CPC .............. *A61K 9/167* (2013.01); *A61K 33/04* (2013.01); *A61K 33/24* (2013.01); *A61L 27/025* (2013.01);
(Continued)

(58) Field of Classification Search
None
See application file for complete search history.

(56) References Cited

U.S. PATENT DOCUMENTS

2004/0259945 A1    12/2004    Brewer et al.
2017/0224872 A1    8/2017     Shavit

FOREIGN PATENT DOCUMENTS

CN            1376637 A   * 10/2002    ............. C01G 41/02
CN       107 952 071 B     12/2019
(Continued)

OTHER PUBLICATIONS

Benoist et al., "X-ray photoelectron spectroscopy characterization of amorphous molybdenum oxysulfide thin films." Thin Solid Films, vol. 258 (1995), pp. 110-114.*
(Continued)

*Primary Examiner* — Daniel Berns
(74) *Attorney, Agent, or Firm* — Smith Patent, LLC; Chalin A. Smith

(57) ABSTRACT

The present disclosure is related to inorganic, biocompatible material compositions for bioactivatable devices, devices, and products comprising transition metal chalcogenides, such as molybdenum sulfides, that can be converted in vivo from a non-bioactive state to a bioactive state upon exposure to physiological conditions, wherein the bioactivated transition metal chalcogenide derivatives, such as molybdenum sulfide derivatives, exhibit copper-chelating activities. Various methods for the application of these compositions for enhancing biocompatibility and reducing or modulating copper-dependent biological reactions are provided.

12 Claims, 13 Drawing Sheets

(51) Int. Cl.
A61K 33/24 (2019.01)
A61L 27/02 (2006.01)
A61L 27/30 (2006.01)
A61L 27/54 (2006.01)
A61L 31/08 (2006.01)

(52) U.S. Cl.
CPC ........... A61L 27/306 (2013.01); A61L 31/088 (2013.01); *A61L 2300/10* (2013.01); *A61L 2300/608* (2013.01); *A61L 2420/08* (2013.01)

(56) References Cited

FOREIGN PATENT DOCUMENTS

| KR | 2020 0097946 A | 8/2020 | | |
|---|---|---|---|---|
| KR | 20200097946 | * | 8/2020 | ............... A61C 8/00 |

OTHER PUBLICATIONS

Wang, Zhongying et al., *Environ. Sci. Technol.*, 2016, 50: 7208-7217.

Zhongying Wang et al., "Chemical Dissolution Pathways of $MoS_2$ Nanosheets in Biological and Environmental Media", *Environ. Sci. Technol.* 2016, 50, 7208-7217.

* cited by examiner

BIOACTIVATABLE DEVICES AND RELATED METHODS

CROSS-REFERENCE TO RELATED APPLICATIONS

The instant application corresponds to the U.S. National phase of International Application No. PCT/EP2021/076987, filed Sep. 30, 2021, which, in turn, claims priority to U.S. provisional application 63/088,534, filed on Oct. 7, 2020, the respective contents of which are hereby incorporated by reference in their entirety.

TECHNICAL FIELD OF THE PRESENT INVENTION

The present disclosure is related to inorganic, biocompatible material compositions for bioactivatable devices comprising transition metal chalcogenides, such as molybdenum sulfides, that can be converted in vivo from a non-bioactive state to a bioactive state upon exposure to physiological conditions, wherein the bioactivated transition metal chalcogenide derivatives, such as molybdenum sulfide derivatives, can exhibit copper-chelating activities. Various methods for the application of these compositions for enhancing biocompatibility and reducing or modulating copper-dependent biological reactions are provided.

BACKGROUND OF THE PRESENT INVENTION

From a product development perspective, improving the biocompatibility of manufactured medical device implants can be a necessary design consideration for their optimal performance in vivo. Various coatings for medical implants have been developed to provide a biocompatible barrier between the substrate material of implants and the surrounding tissues in order to improve their general acceptability under foreseeable physiological conditions. Biocompatibility is a property of a biomaterial that enables it to respond to a given biological environment in a manner that does not cause adverse effects to the contacting biological tissues. In general, different types of medical implants can be constructed of various metal or metal alloy substrates for forming the structural support, including Titanium, Tantalum, Cobalt-Chromium, Nitinol, and Stainless steel. Many medical implants can further incorporate one or more polymeric materials to enhance structural properties and device performance, including derivatives composed of medical-grade polysulfones, polyamides, polyurethanes, polyesters, polyethers, and silicones. Additionally, medical implants can be composed of one or more ceramic materials to enhance surface properties and/or tissue interaction capabilities, including oxide ceramics, silica ceramics, hydroxylapatite, tricalcium phosphate and equivalents. Typically, as the first level of control, a substantially biocompatible material can be selected in order to form the basic substrate layer, by employing exemplary materials listed above. Although these commonly used biocompatible materials may provide adequate mechanical/structural properties, it may be desirable in most clinically demanding situations to provide an additional layer of coverage by overlaying the outermost substrate with a second biocompatible material that can be optimized and homogeneously formulated for suitable uses.

The various types of coatings for therapeutic interventions can be classified into different categories, either as (a) "passive" coatings if lacking a pharmacological activity; or (b) "bioactive" coatings if able to inherently confer one or more pharmacological activities independent of an externally provided medicinal substance, or (c) "drug-release" coatings if supplemented with a medicinal substance that can be incorporated as an integral part. For manufacturing various types of vascular implants, such as stents, covered stents, stent grafts, and vascular scaffolds, an alternative option is to employ biostable/biodegradable organic polymer matrices, such as PLLA, PDLA, PLGA, PBMA, and PVDF-HFP. These organic polymer matrices can be formulated to hold and release certain pharmaceutical agents such as Paclitaxel, Sirolimus, Everolimus and Tacrolimus in order to minimize certain adverse effects observable after implanting drug-eluting stents (DES). In contrast to the production of bare metal stents (BMS), the manufacturing of DES as a product involves: (a) increased development time; (b) higher development costs; (c) longer regulatory approval phases; (d) prolonged time to market expectations by cumulatively introducing substantial business risks since the market demand may diminish during prolonged development schedules, or may diverge in a different direction from the time of product approval.

In particular, the development of drug-eluting, polymeric-based medical device coatings (DES) can be very challenging and resource-intensive from technical, regulatory, clinical, and business perspectives. On the technical level, the optimization process for formulating pharmaceutical agents of interest into polymeric matrices designed for sustained-release capability can be very labor intensive, involving at least the following: (a) upfront characterization work of substrate-solvent-polymer-drug interaction; (b) characterization of mutual chemical compatibility; (c) determination of applicable concentration ranges; (c) selection of coating methodology and parameters; (d) characterization of agent distribution; (e) characterization of phase-change behavior and morphological states; (f) determination of degradation/storage/shelf-life stability; (g) strict normative processing requirements; and (h) extensive validation and verification work. Thus, the multi-step, complex development process required in formulating drug-releasable, polymeric matrices can prolong the development time and further complicate development efforts, translating predictably to increased manufacturing costs.

From a regulatory perspective, the incorporation of polymeric scaffolds and one or more pharmaceutical agent(s) as additional components to the medical device supporting material, can further complicate the regulatory process since each of these components would have to fulfill the safety and efficacy requirements established by regulatory agencies. Compliance requirements include the evaluation and characterization of biocompatibility; involving at least the following aspects: (a) hemocompatibility; (b) cytotoxicity; (c) sensitization potential; (d) microbiological assessment; (e) in vitro and in vivo preclinical studies, including histochemical assessments, characterization of pharmacokinetics/pharmacodynamics, including determination of therapeutic dosage regimen and effective concentration; (f) sustained release characteristics; (g) stability and degradation profiles; (g) determination of metabolization pathways; and (i) toxicological assessment of the embedded pharmaceutical agents and breakdown products. Definitive clinical validation requires the performance of statistically relevant, randomized clinical studies, with defined procedural and clinical end-points prior to market entry. As regulatory standards continue to escalate, the time to market can be expected to proportionately increase due to additional regulatory hurdles that may be reasonably anticipated.

From a clinical perspective, the DES coatings have been met with mixed clinical success for reasons related to the complexity of DES coatings. When cytostatic agents aimed at reducing neointimal growth are incorporated into DES coatings, such as Paclitaxel, one well-characterized disadvantage of DES coatings is predictably the vascular tissue damage that can occur if the locally-releasable drug concentration cannot be controllably released. The period of active drug release can be expected to occur during the first several months following implantation, and the drug-release profile cannot be reasonably expected to extend beyond the first six months of post-implantation. Once the drug reservoir is depleted, the therapeutic capability of the DES coating can be expected to diminish rapidly. Thus, the duration of therapeutic efficacy may be only a fraction of the potential lifetime of an implant. The premature depletion of drugs may prompt the need for repeated follow up checkups and subsequent therapeutic re-intervention.

The therapeutic effectiveness of drug-eluting medical devices is limited by a variety of different factors, including stability, solubility and bioavailability of the bioactive agent. The exemplary drug agents described previously are hydrophobic and exhibit a relatively low aqueous solubility, making them good candidates for longer-term drug-release applications. However, these hydrophobic drugs are also known to enrich in lipid-laden local tissues, with potentially deleterious side effects on adjacent healthy tissue. Hydrophilic and ionic drugs on the other hand exhibit a relatively higher aqueous solubility, and accumulate less in local tissues, but are ill-suited for longer-term drug-release applications—as they diffuse more rapidly from drug-eluting medical devices than their hydrophobic counterparts.

Specific ionic compounds considered useful for the treatment of non-vascular and vascular diseases include without limitation transition metal chalcogenides, such as tetrathiomolybdates and tetrathiotungstates. While these hydrophilic and ionic drugs show promising anti-inflammatory, anti-angiogenetic, antibacterial and anti-cancer properties when formulated for systemic administration, their relatively high aqueous solubility severely limits their potential use for local drug delivery when formulated as a coating on non-vascular and vascular medical implants. For example, ammonium tetrathiomolybdate has a reported aqueous solubility of at least 7 mM, which in turn allows for relatively rapid diffusion when formulated as a drug delivery composition. One approach in dealing with the high solubility and thus diffusion rate of aforementioned compositions consists of providing precursor substances that exhibit an optimum, lower solubility, yet that can be converted in vivo from a non-bioactive state to a bioactive state. Thereby, the onset and duration of the desired therapeutic effect is not modulated solely based on diffusion, but follows in tandem with the bioconversion ability of the non-bioactive species in vivo.

One such source for transition metal chalcogenide compounds in vivo has been identified by the inventors of the current disclosure as molybdenum sulfide. However, whereas amorphous molybdenum sulfides exhibit good adherence to a variety of different substrates, their oxidative stability is poor and their aqueous solubility considerably high. Crystalline molybdenum sulfides, on the other hand have better oxidation stability, but easily flake off from substrates, a property that is widely used for lubrication applications. In addition, their solubility range is limited to about 0.125 to 1.25 µM in aqueous environments, thereby negating their optimum use as a bioconvertible source for transition metal chalcogenides in vivo. Thus, there exists a need for improved material compositions comprising transition metal chalcogenides, for use as medicament on medical devices, that strike a fine balance between the extremes of high and low aqueous solubility, as well as oxidative stability, and that are bioavailable in vivo at concentration levels therapeutically effective, and yet have a sufficient duration of therapeutic effectiveness useful for longer-term, local drug release applications.

The present inventors have found, that the above described problems can be solved by providing compositions for bioactivatable devices, comprising one or more transition metal chalcogenides, that are converted in vivo from a non-bioactive state to a bioactive state under physiological conditions following implantation, wherein the bioactivated transition metal chalcogenide derivatives, such as molybdenum sulfide derivatives, exhibit copper-chelating activities that promote anti-inflammatory and anti-proliferative effects on surrounding tissues. These bioactivatable transition metal chalcogenides of the current disclosure are formulated in a substantially insoluble form and are capable of slow metabolization into a pharmacologically active transition metal-based (oxo)thiometallate upon exposure to physiological conditions.

SUMMARY OF THE PRESENT INVENTION

Various embodiments are directed to inorganic, biocompatible material compositions for bioactivatable devices, comprising one or more transition metal chalcogenides, that can be converted in vivo from a non-bioactive state to a bioactive state under physiological conditions following implantation, wherein the bioactivated transition metal chalcogenide derivatives, such as molybdenum sulfide derivatives, exhibit copper-chelating activities that can promote anti-inflammatory and anti-proliferative effects on surrounding tissues. The present inorganic, biocompatible material compositions comprising one or more transition metal chalcogenides can be formulated as a coating, a film, a layer, a membrane, a matrix, particulates, fibers, microspheres, and blends of variable chemical composition, physical geometry, dimension and spatial arrangement.

Various embodiments are directed to methods for manufacturing inorganic, biocompatible material compositions for bioactivatable devices, comprising one or more transition metal chalcogenides, that can be converted in vivo from a non-bioactive state to a bioactive state under physiological conditions following implantation, wherein the bioactivated transition metal chalcogenide derivatives, such as molybdenum sulfide derivatives, exhibit copper-chelating activities that can promote anti-proliferative, anti-inflammatory, and anti-thrombogenic effects on surrounding tissues.

In a preferred embodiment, the material composition as medicament, comprises:
  one or more transition metal chalcogenides, provided in a non-bioactive form capable of in vivo or in vitro conversion into a bioactive form upon exposure to physiological conditions;
  wherein the non-bioactivated transition metal chalcogenides are defined by:

$$M_x A_y B_z \quad \text{(Formula I)}$$

having an index number x, y, and z that each constitute an atomic ratio of the material composition;
    wherein M is a transition metal element present in an atomic ratio x of 1 or 3;
    wherein A is a first chalcogenide element present in an atomic ratio y of 0 to 9;

wherein B is a second chalcogenide element present in an atomic ratio z of 0 to 9, and;

wherein a sum of the atomic ratios y and z of the first and second chalcogenide elements A and B is 2, 3, or 9, defining a first stoichiometric ratio, wherein the sum of the atomic ratios y and z of the first and second chalcogenide elements A and B, is present in the first stoichiometric ratio, or present in a second, non-stoichiometric ratio, that differs in a range from 0.01 to 20% from the first stoichiometric ratio.

In the preceding embodiment, the transition metal M of the material composition is selected from the group consisting of tungsten, vanadium, rhenium, titanium, chromium, manganese, iron, cobalt, zirconium, niobium, ruthenium, rhodium, palladium, silver, hafnium, tantalum, osmium, iridium, and platinum.

In the preceding embodiments, the transition metal M of the material composition is further selected from the group consisting of molybdenum, tungsten, vanadium, and rhenium.

In the preceding embodiments, the first chalcogenide element A and the second chalcogenide element B of the material composition are independently selected from the group consisting of oxygen, sulfur, and selenium.

In the preceding embodiments, the transition metal M of the material composition is molybdenum, and the first chalcogenide element A of the material composition is sulfur.

In the preceding embodiments, the second chalcogenide element B of the material composition is oxygen, present in a non-stoichiometric ratio, wherein the atomic ratio x is 1, y is 4 minus z, and z ranges from 1 to 4.

In the preceding embodiments, the atomic ratio of Y:X of the material composition ranges from 1.5 to 2.2.

In the preceding embodiments, the material composition is titaniferous, having an atomic ratio of Ti:M in the range of 0.01 to 20%.

As a separate embodiment, a multilayer structure as medicament comprising a material composition according to the previous embodiment is used, wherein the material composition is formed in multiple layers.

In the preceding embodiment, the multilayer structure exhibits consecutive layers of the material composition, wherein a bottom layer of the multilayer structure is an adhesion layer and a top layer of the multilayer structure is fluoropassivated.

As another embodiment, the material composition according to any of the preceding embodiments or the multilayer structure as described above is intended for use in the prevention and/or treatment of non-vascular and vascular diseases, selected from the group consisting of atherosclerosis; thrombosis; inflammation; infection; restenosis; angiogenesis, and tumor growth.

DETAILED DESCRIPTION OF THE PREFERRED EMBODIMENTS

A. Definitions

Figure 1:
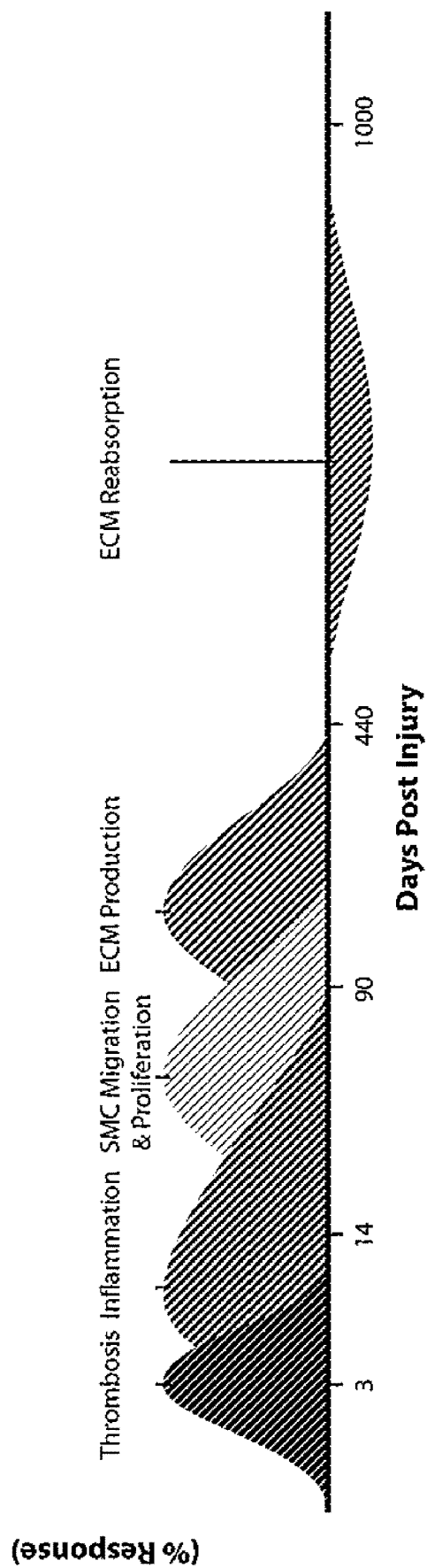
FIG. 1 is a profile of the various phases of post-integration responses that can be expected following stent implantation.

The term "material compositions" refers to any composition or formulation comprising $M_xA_yB_z$ (Formula I) of the present disclosure and derivatives thereof, wherein the material composition is a substantially inorganic and biocompatible material comprising one or more transition metal chalcogenides, that can be converted in vivo from a non-bioactive state to a bioactive state under physiological conditions following implantation, wherein the bioactivated transition metal chalcogenide derivatives, such as molybdenum sulfide derivatives, exhibit copper-chelating activities that can promote anti-inflammatory and anti-proliferative effects on surrounding tissues. The "material compositions" of the present disclosure can be incorporated into any portion of various medical devices, for application over the external surface of medical devices as an external coating and/or for sub-surface integration as a film, a layer, a matrix, a bed of fibers, or microspheres of variable morphology and composition.

The term "medical device(s)" includes any device that can be useful for diagnostic, therapeutic, and/or cosmetic procedures/interventions. The term "medical devices," "implantable devices," and "devices" can be used interchangeably herein.

The term "bioactivatable device(s)" refers to any tangible "devices," "medical devices," and/or "implantable devices" incorporating the "material compositions" comprising $M_xA_yB_z$ (Formula I) of the present disclosure and derivatives thereof, wherein the material composition is a substantially inorganic and biocompatible material comprising one or more transition metal chalcogenides, that can be converted in vivo from a non-bioactive state to a bioactive state under physiological conditions following implantation, wherein the bioactivated transition metal chalcogenide derivatives, such as molybdenum sulfide derivatives, exhibit copper-chelating activities that can promote anti-inflammatory and anti-proliferative effects on surrounding tissues. The "bioactivatable devices" can be composed of any number of individual subcomponents or can refer to a single component of a multi-component system, such as instruments, equipment, prosthetics, and equivalents.

The term "coating" refers to one or more material composition that can be applied to a broad variety of substrates to achieve optimal performance for medical devices.

The terms "covered stent," "stent graft," "graft," or "vascular scaffold" can be interchangeably used herein to refer to an endovascular device comprising a metal structural support (e.g., stent) and a membrane component providing at least a filtering function. These devices can be described in other references by alternative terms such as "coating," "covering," "graft," "scaffold," "membrane," "matrix," "web," "sheet," "layer," and/or "film."

The term "protective barrier" refers to any physical barrier that can prevent the loss of fluid from damaged blood vessels; reduce bleeding; prevent further physical damage; reduce inflammation; promote healing; enable embolic protection; promote or prevent blood clotting; promote or prevent adhesion to tissue surface; promote de novo collagen formation; promote tissue regeneration; promote innervation; promote vascularization; decrease the period for healing, and/or promote cellular growth rates; prevent scarring; prevent viral, microbial, fungal infection; protect from extreme environmental conditions, including extreme heat and cold temperatures.

The term "membrane" refers to a "structure, having lateral dimensions much greater than its thickness, through which transfer may occur under a variety of driving forces." PAC, Vol. 66, No. 8, page 1671, "Thin films including Layers: Terminology in Relation to their Preparation and Characterization" (IUPAC Recommendations 1994). Membranes can function as a selective barrier that can permit the passage of certain "permeable" constituents through, and can selectively retain "non-permeable" constituents that cannot pass through the membrane. The degree of selectivity and permeation characteristics of a membrane can depend for example on the average membrane pore size, size distribution, spatial arrangement, pressure differential and membrane material-permeate interaction, among others. Depending on the pore size, they can be classified as microfiltration (MF), ultrafiltration (UF), nanofiltration (NF) and reverse osmosis (RO) membranes.

The term "coating" refers to a "film" defined as a "condensed matter restricted in one dimension," according to standard definitions established by physical chemists. Pure & Applied Chemistry (PAC), Vol. 66, No. 8, page 1671, "Thin films including Layers: Terminology in Relation to their Preparation and Characterization" (IUPAC Recommendations 1994). The terms "nanoscopic film, microscopic film and macroscopic film should apply specifically to films which have lateral dimensions in the range of several 0.1 nm-100 nm, 0.1-100 µm and above 100 µm, respectively," according to PAC, Vol. 66, No. 8, page 1671. The terms "nanometer thick film, micrometer thick film, millimeter thick film, etc. must refer specifically to film thicknesses in the ranges 0.1-100 nm, 0.1-100 µm, 0.1-100 mm, respectively," according to PAC, Vol. 66, No. 8, page 1671. In general terms, a "coating" differs from a "layer" and a "membrane" in that the entirety of the "coating" material is completely affixed to an underlying surface composed of another material such that there is no separation between a "coating" and the surface on which the "coating" is attached.

The term "layer" refers to "any conceptual region of space restricted in one dimension, within or at the surface of a condensed phase or a film." PAC, Vol. 66, No. 8, page 1671, "Thin films including Layers: Terminology in Relation to their Preparation and Characterization" (IUPAC Recommendations 1994).

The term "incorporating" refers to the structural integration of material compositions comprising transition metal chalcogenides, as defined by $M_xA_yB_z$ (Formula I) of the present disclosure and derivatives thereof into suitable vascular support structures of interest, in which the compositions can be incorporated as components of particulates, fibers, films, membranes, meshes, sieves, mats, or equivalents known to persons skilled in the art, and/or combinations thereof.

The terms "encapsulating," "enveloping" and "blending" can be used interchangeably to refer to the enclosure of substrate material(s), partially or entirely, by employing one or more material compositions comprising transition metal chalcogenides, as defined by $M_xA_yB_z$ (Formula I) of the present disclosure and derivatives thereof. The material compositions are not limited as to the exact disposition of the formed matrix, for example, the material composition can be incorporated, adhered, layered, reacted, blended/mixed, embedded, grafted, bonded, crosslinked, copolymerized and/or reacted with an intermediate layer that can be adhered, adjoined, affixed and/or reacted, or combined with other conventional biomaterials in any manner. Furthermore, the material compositions can be combined with a conventional biomaterial, and the combination can be adhered onto or around or within the medical device or the surface of the device so that the material composition and the biomaterial can be deposited simultaneously or sequentially. This disclosure contemplates the co-formulation of any biomaterial, including bioactive agents and a material composition of Formula I, or the incorporation of material compositions comprising transition metal chalcogenides, as defined by $M_xA_yB_z$ (Formula I) of the present disclosure and derivatives thereof into a biomaterial or medical device.

The term "chelating agent" refers to a chemical compound that can coordinate with a metal by functioning as a ligand in order to form a chelate complex, which may be useful for trapping or removing or reducing the bioavailability of heavy metal ions from local biological environments. Metal-binding ligands can be interchangeably referenced as chelants, chelators, chelating agents, or sequestering agents, in which the resulting complexes can be referenced as chelate compounds. Chelation is the formation or presence of two or more separate coordinate bonds between a polydentate (multiply bonded or coordinated) ligand and a single central atom. Proteins, polysaccharides, and polynucleic acids can function as polydentate ligands for many types of metal ions, including all metalloenzymes.

The term "bioactive" refers to the potential or capacity of a compound/composition/substance that can confer a biological effect by actively and intentionally inducing, altering, preventing, and/or inhibiting a biological response from tissues or an organism by mediating specific biochemical/physiological reactions at the molecular level. In contrast, the term "non-bioactive" refers to lacking bioactivity properties and/or functions. The terms "bioactive" and "pharmacologically active" can be interchangeably used herein.

The term "pharmacologically active" refers to the capacity to affect the physiology or the function of the body of human/animal subjects. Substances having pharmacologically activity can be artificially or naturally derived, i.e., those created by the body in response to stimulation or injury.

The term "absorption" refers to the degradation of a material within the body and the metabolic elimination of the resulting degradation products from the body.

The term "substance" refers to any chemical substance or material having a definite chemical composition.

The term "a" refers to one or more of modified nouns and/or pronouns.

B. Soluble Copper-Chelating Agents for Therapeutic Intervention a. In Vivo Effect of Soluble Copper-Chelating Agents for Treatment of Wilson's Disease Over 50 years ago, a strong correlation between the high molybdenum dietary content among ruminant animals and the development of copper-deficiency symptoms was recognized. A diet consisting of high molybdenum and sulfur content resulted in high concentration of molybdate ions and sulfide ions in the cattle rumens, which were converted in vivo into tetrathiomolybdate derivatives. Tetrathiomolybdates have been shown to exhibit copper-binding activity, and can function as potent copper-chelating agents. Wilson's disease is an autosomal recessive genetic disorder that can cause the accumulation of copper in tissues, manifesting as neurological or psychiatric symptoms and liver diseases. Tetrathiomolybdates, formulated as ammonium salts, can be an effective systemic therapeutic agent for Wilson's disease by removing excess copper. Since ceruloplasmin levels can be abnormally low (<0.2 g/L) in 80-95% of the cases, ceruloplasmin levels can be monitored to assess the effectiveness of therapy. Wilson's disease can be diagnosed by comprehensive analysis of neurological symptoms, Kayser-Fleisher rings, and ceruloplasmin levels. Yasumitsu, Ogra et al.," Metabolic fate of the insoluble copper/tetrathiomolybdate complex formed in the liver of LEC rats with excess tetrathiomolybdate ", Journal of Inorganic Biochemistry 2000, 78, 123-128; Brewer, George, J.," Copper Lowering Therapy With Tetrathiomolybdate as an Antiangiogenic Strategy in Cancer ", Current Cancer Drug Targets 2005, 5, 195-202; Bruce, G. Redman et al.," Phase II Trial of Tetrathiomolybdate in Patients with Advanced Kidney Cancer" Clinical Cancer Research 2003, 9, 1666-1672; Brewer, George, J. et al, "Treatment of Metastatic Cancer with Tetrathiomolybdate, an Anticopper, Antiangiogenic Agent: Phase I Study", Clinical Cancer Research 2000, 6, 1-10.

b. In Vivo Effect of Soluble Copper-Chelating Agents for Controlling Angiogenesis in Cancer Therapy Angiogenesis is a physiological process by which new blood vessels are generated from pre-existing vessels, in contrast to vasculogenesis that involves the de novo formation of endothelial cells. At the cellular level, angiogenesis involves the secretion of growth factors by pre-existing endothelial cells that can induce the expression of many proteins required for the proliferation of such cells leading to new vessel formation. One promising mode of treatment for many diseases and conditions related to unregulated angiogenesis is the systemic administration of one or more anti-angiogenic agents capable of inhibiting the activities of endogenous proteins required for angiogenesis. At the cellular level, angiogenesis has been shown to be a copper-dependent process in that copper can stimulate the proliferation and subsequent migration of endothelial cells, which are necessary steps for the formation of new vascular tissue. At the molecular level, angiogenic mechanism of action involves the activation of copper-dependent enzymes and other copper-dependent proteins that can mediate biochemical pathways leading to endothelial cellular proliferation and endothelial migration.

Tumorgenesis involves the migration of tumor cells from a latent state to a malignant state by increasing the blood flow to the tumor area, through the activation of angiogenic pathways within pre-existing vascular tissue localized around a tumor. Copper-chelating agents can decrease or inhibit the secretion of many angiogenic factors by tumor cells, suggesting that angiogenesis occurs by copper-dependent biochemical processes. Many human tumors can cause an increase in copper levels in the serum to effectively up-regulate the activities of copper-dependent protein effectors that are necessary for tumor growth and migration. Thus, high copper levels can correlate with the extensiveness of tumor burden and the seriousness of prognosis.

Systemic administration of copper chelators can reduce the rate of tumor growth and microvascular density in animal models. Although understanding the mechanism of action for the inhibition of endothelial cell proliferation and the tumor secretion of angiogenic factors requires further research, a promising approach to cancer management is to develop therapeutic molecules that can specifically target copper-dependent enzymes, chaperones, and transporters. Copper chelators that can be orally administered have been shown to be effective in inhibiting angiogenesis in cancer patients in clinical trials, suggesting that targeting copper-dependent proteins for inhibition can be a reasonably effective therapeutic intervention.

The physiological activity and copper-binding activity of ammonium tetrathiomolybdate (ATTM or short TTM) has been well-characterized, showing that TTM exhibits low toxicity and is well-tolerated when taken orally by patients. TTM can block copper absorption in the gastrointestinal tract in subjects. TTM has been shown to be capable of binding to copper with high specificity and binding non-specifically to proteins, thereby forming an inactive tripartite complex that can be removed from the body via bile and urine. When ingested TTM can be absorbed via the GI tract, and it can complex with soluble copper available in the circulation. The formation of the Cu/TTM complex has the effect of decreasing the amount of copper available for cellular uptake and subsequent binding interactions with many intracellular copper-dependent proteins that can mediate endothelial proliferation and migration during angiogenesis, including ceruloplasmin, heparin, Cu/Zn superoxide dismutase 1 (SOD1), and cytochrome c oxidase. It has been shown that intracellular uptake of tetrathiomolybdate (ATN-224), a copper-chelating agent, can cause the inhibition of endothelial cell proliferation in vitro using HUVEC cell lines and the inhibition of angiogenesis in vivo using mice models by specifically inhibiting SOD1 activity in a dose-dependent manner. Ammonium tetrathiomolybdate has been shown to treat solid tumors in murine cancer models and in human cancer patients, by sequestering copper away from copper-dependent proteins that mediate endothelial proliferation, and thereby causing the regression of blood vessels. Ammonium tetrathiomolybdate appears to be tumoristatic, but not tumoricidal. Thus, tetrathiomolybdate (ATN-224) has been shown to be effective as an anti-angiogenesis agent for cancer therapy and other conditions characterized by unregulated angiogenic growth, by effectively inhibiting copper-dependent enzyme activities. Clinical Cancer Research, Copper Binding by Tetrathiomolybdate Attenuates Angiogenesis and Tumor Cell Proliferation through the Inhibition of Superoxide Dismutase 1, Juarez et. al. 2006, 12:4974-4982.

c. In Vivo Effect of Soluble Copper-Chelating Agents for Controlling Restenosis for Managing Adverse Effects Post-implantation of Stents Furthermore, it is possible to induce angiogenesis under non-cancerous conditions, for example, during the development of coronary and peripheral vascular diseases, in which the body can respond to a diminution of blood supply to vital organs caused by the vascular diseases by producing new collateral vessels to overcome the ischemic insult. For coronary arterial diseases, the main blood vessel that delivers blood to the heart can develop significant plaque buildup along the inside wall of the coronary artery. Either partial or complete blockage of blood flow to the heart can increase the degree of necrosis of the heart muscle tissue. Other significant vascular diseases include the hardening of arteries and reduced vascular compliancy (arteriosclerosis), the development of blood clots in vessels and blocking of circulation (thrombosis), and the radial expansion of blood vessels due to weakened walls (aneurysm).

A number of medical devices and clinical techniques have been developed to repair and replace blocked vessels caused by coronary and peripheral vascular diseases including stents. However, medical device implants often cause many deleterious side effects from the juxtaposition of such implants against vascular tissue, which can elicit a broad range of cellular responses, including thrombosis, angiogenesis, restenosis and inflammation. Restenosis is defined as the reocclusion of an artery or lumen after a corrective procedure such as CABG, PCTA, or stenting. Restenosis is an inflammation-driven process that results in the formation of neointima, a scar tissue that forms within the innermost lining of vessels or the intima, in response to injury. Vascular surgical procedures such as angioplasty or stent placement frequently induce neointima formation resulting from the proliferation of smooth muscle cells. Pharmacological agents having anti-proliferative, anti-inflammatory, and anti-thrombogenic activities can be incorporated into various coating formulations that may be applied onto medical implants to manage some of these deleterious side-effects and symptoms.

IL-1 alpha secretion at the site of injury can elicit the recruitment and activation of macrophages, which represent the highest cellular source of growth factors. At the molecular level, IL-1 is believed to act a strong contributor of restenosis development by inducing the nuclear translocation of NF-kB and by increasing the expression of platelet-derived growth factor and fibroblast growth factor (FGF). FGF-1 can be a potent inducer of intimal hyperplasia by exhibiting mitogenic activity, stimulating cell migration, and promoting adventitial angiogenesis in the injured vessel wall. In addition to the release of cytokines, many proliferative factors are secreted to stimulate tissue growth.

C. Transition Metal Chalcogenides that Exhibit Copper-Chelating Activity for Incorporation into Medical Devices a. Designing Phase-Adaptive Implants with Tailored Functionality Atherosclerosis is the most common cause of death and morbidity in the Western world, and is expected to increase in developing countries. In the US alone, approximately more than 9% of the population is affected by atherosclerotic disease. In the last 30 years, different types of vascular interventional procedures and devices have been developed for the treatment of various manifestations of arteriosclerotic disease(s).

All medical devices demonstrate inherent limitations in achieving therapeutic efficacy, and collectively, these devices have not succeeded in satisfying a range of clinical challenges that can persist throughout the term of treatment. For example, although the bare metal stents (BMS) can be quite effective in preventing acute elastic recoil following balloon angioplasty, it is necessary to preemptively treat for potential acute stent thrombosis through mandatory dual anti-platelet therapy (DAPT), and the persistent problem of in-stent restenosis (ISR) had remained largely unresolved until the first generation of drug eluting stents (DES) were introduced as an alternative option. However, although the first generation DES can be effective in reducing in-stent restenosis (ISR), it was observed that healing is profoundly delayed and that the stented lesions can be susceptible to late stent thrombosis, leading to significant long-term clinical complications. Although other devices, such as drug-eluting balloons (DEB) and bioabsorbable vascular scaffolds (BVS) have been developed to circumvent ISR, the non-permanent nature of bioabsorbable scaffolds may be deemed insufficient at this stage for providing an accurate, long-term, side-by-side efficacy comparison due to as of yet insufficient long-term clinical evidence. As a consequence, BMS and DES remain currently a major treatment option for obstructive vascular diseases.

FIG. 1 is a profile of the various phases of post-integration responses that can be expected following stent implantation (based on Kukreja et. al., "The Future of Drug-Eluting Stents," Pharmacological Research 2008, 57, p171-180). A consistent problem has been recognized from reviewing the clinical outcomes of procedures for the treatment of obstructive vascular diseases, such as percutaneous transluminal angioplasty (PTA) in combination with BMS and DES placement. The most severe and persistent clinical problems observed after these forms of conventional vascular therapy suggest that there is a correlation between specific phases of implant integration and subsequent adverse response(s) by the human body. Major clinically relevant, adverse effects include: (a) thrombus formation at an injury site; (b) local inflammation; (c) proliferation of smooth muscle cells; (d) and excessive formation of extracellular matrix (ECM). Each of these respective phases (a)-(d) are illustrated in FIG. 1.

To counteract the adverse effects caused by conventional forms of vascular therapy, the ideal solution is to identify suitable methods, materials and medical device designs that can address not only just a single adverse effect observed during one particular phase of implant integration, but a comprehensive approach that can take into account major anticipated challenges to tailor an optimal performance solution, such as: (a) specific adverse reaction characteristic of each phase; (b) relative period for each phase with respect to total implantation period; and (c) complete deployment period required for treatment. Thus, this comprehensive approach to designing medical devices can take into consideration biocompatibility requirements (functional and biomedical compatibility), optimal mechanical design/engineering features, and suitable material selection that can effectively address each unique phase of implantation.

Targeting Thrombosis: As soon as an artificial substrate surface comes into contact with blood, a complex immune response can be expected to unfold dynamically. Blood contains a wide variety of soluble proteins that can adsorb onto the surface of any material surface of medical devices in order to form a complex layer of proteins. The composition and structure of this protein adsorbate layer is determined by the varying natural affinities of individual proteins to a given substrate. The subsequent cellular response can be modulated through this protein layer and may trigger adverse events such as the activation of the blood-coagulation cascade. Particularly during the initial response modulation phase, it is expected that protein folding and denaturation processes can occur upon the adsorption onto an implant surface, in which the process of protein denaturation can often correlate with a loss or impairment of the proteins' biological function, selectivity and activity within a biological environment. As a result, the biological response towards the surface may be further degraded. Hence, a comprehensive approach can introduce additional biologically relevant properties to an artificial implant surface in order to maintain the adsorbed protein adsorbate layer in its native state, and can control the adsorption and composition of a protein adsorbate layer formed upon exposure of the implant surface to physiological conditions. Concerning the different phases of implant integration, this desired effect must be present within the first phase of implant integration, i.e., preferably within the first two weeks post-implantation.

As several embodiments, the disclosed bioactivatable medical devices of the present disclosure comprising transition metal chalcogenides can be coated covalently or non-covalently with anti-thrombogenic or anti-coagulant pharmaceuticals, which can confer an implant surface with anti-thrombogenic properties within the acute phase of implant integration. Such agents can typically comprise of anticoagulants, such as heparin, or specific antibodies which can prevent thrombocyte activation, and synthetic glycocalyx coatings that can prevent thrombocyte adherence and equivalents. However, certain coatings exist that can indirectly avoid cellular interaction by being capable of reversibly binding certain blood proteins, particularly albumin, without leading to their denaturation. These coatings can be much more preferable over anti-thrombogenic coatings containing pharmaceutical agents, because due to their inherent mechanism of action, they can function independently of pharmacological agents. Fluoropassivation-based coatings, layers and agents can fall into this particular category and can represent the most preferred embodiments for addressing the first implant integration phase.

Targeting Inflammation, Proliferation and Restenosis: Recently, copper ions have been recognized to play an important role in mediating various cellular responses to vascular injury. In the first stage of an acute inflammatory response to a vascular lesion, peripheral blood monocytes can regulate the response to the injury by releasing polypeptide cytokines and growth factors. Studies show that copper-chelating agents can produce an anti-angiogenic and anti-inflammatory effect by reducing systemic copper levels and suppressing the pathways that can regulate vascular injury in vivo. By depleting the actively available $Cu^{2+}$ concentration, the inflammatory response modulation can be down-regulated, causing the desired anti-inflammatory, anti-proliferal and anti-restenotic effect. Copper-chelating compounds can be utilized as active components in sustained release formulations on stents and other medical devices to induce an anti-inflammatory effect, to regulate neointimal growth, and to reduce the risks of restenosis. A systemic concentration of 5 µM of ATM has been shown to be sufficient to achieve inhibition of venous endothelial cell proliferation. ATM has demonstrated significant potential as a viable anti-angiogenic, anti-cancer agent by producing anti-proliferative effects on venous endothelial and possibly tumor proliferation in vivo (Carpenter et. al., 2007). TTM has been shown to inhibit the release of IL-1α at 250 nM, which was observed to be consistent with the concentration of TTM used in preclinical and clinical studies for the management of solid tumor growth (Mandilov et. al., 2003; Brewer et al., 2000; Cox et al., 2001; Pan et al., 2002).

b. Incorporation of Transition Metal Chalcogenides Exhibiting Copper-Chelating Activity into Medical Devices 1. Chemistry of Pharmacologically Active Copper-Chelating Agents The inventive concept is to first address the clinical problems encountered during the subacute implantation phase by providing a non-bioactive (pharmaceutically inactive) material composition as a coating when initially formulated. The coating comprising transition metal chalcogenides, such as $MoS_2$, can be deposited onto medical devices with the expectation that the non-bioactive form of the material becomes bioactive (pharmacologically active) when physiologically converted and activated in vivo, as the transition metal chalcogenide species becomes converted into a more soluble form that exhibits copper-chelation activity to address the adverse effects of implantation such as local inflammation, proliferation, and restenosis.

The following group VIb transition metal based tetrathiometallates can demonstrate pharmacologically active copper-chelating activities:

| "ATTM" | Ammoniumtetrathiomolybdate; $(NH_4)_2MoS_4$ |
|---|---|
| "ATTT" | Ammoniumtetrathiotungstate; $(NH_4)_2WS_4$ |

These tetrathiometallates are capable of forming a tripartite Tetrathiometallate-copper-protein complex in patients, thereby capable of reducing endogenous copper levels, and inducing a variety of desired therapeutic effects. However, these compounds, while being clinically effective when systemically administered as part of copper-chelation therapy, these compounds may be lacking certain properties to render them adequately suitable for locally sustainable drug-release applications, namely demonstrating high aqueous solubility and foreseeably lacking aqueous and overall storage stability. Additionally, mal-odor formation and lack of adequate solubility in organic solvents specifically for processing in coating applications are disadvantageous with regard to a local drug-release formulation on medical devices.

Several approaches can be applied for decreasing the aqueous solubility of transition metal based tetrathiometallates. One option is to replace the respective cation used for salt formation. As the ammonium cation derived tetrathiometallates (such as ATTM and ATTT) can represent the synthetically most easily accessible compounds for persons skilled in the art, the replacement of the ammonium ion with ternary or quaternary ammonium ions of the form $(NR_4)^+$ can represent an approach for modulating the resulting TTM solubility. While such an approach can be straightforward and effective, the introduction of such organically substituted ammonium ions can cause undetermined pharmacological effects, for example on the distribution, the elimination, the toxicology, and the safety profiles. Another approach is to use the natural tendency of transition metals to form versatile clusters based on oxo- and thio-metallates, wherein the anionic metallate species is able to condense into respectively larger anionic clusters including without limitation $[Mo_2(S_2)_6]^{2-}$, $[Mo_2S_4(S_2)_2]^{2-}$, $[Mo_2S_4(S_4)_2]^{2-}$, $[Mo_3S(S_2)_6]^{2-}$ and equivalents (See patent references U.S. patent application No. 20040259945 and U.S. patent application No. 20040259945 U.S. Pat. No. 7,189,865, WO2008109730 (A1), US2006160805 (A1), WO2005082382 (A1), US2010216775 (A1)).

The present disclosure discloses a different approach for producing transition metal chalcogenides to be deposited/incorporated into medical devices, that can be formulated in a substantially insoluble form and capable of slow metabolization into a pharmacologically active transition metal-based (oxo)thiometallate upon exposure to physiological conditions, and simultaneously conferring other advantages such as biocompatibility, stability or solubility of an (oxo) thiometallate formulation. While other substantially bioinert, inorganic compounds are known, including compounds such as graphene, silicon carbide and diamond-like carbon, they differ substantially from the present inventive concept by the absence of substantial in vivo metabolization capability.

The target precursor compound $MoS_2$ is an as of yet medically unused type of semiconductor substance with a band gap of 1.2-1.8 eV, which will provide an alternative to other semiconductor compounds used in conjunction with medical devices, such as graphene (having no band gap, unless doted), DLC, diamond like carbon coating (having a band gap range of ~ 0.8-3 eV), and SiC, silicon carbide (having a band gap of ~ 2.39 eV). In contrast to these, $MoS_2$ is positioned approximately in the middle band gap range. The precursor compound $MoS_2$ can reasonably exhibit at least the same, similar or superior properties as compared to other semiconductor types on the basis of their electronic structure and diffusion barrier properties.

The material compositions of the present disclosure comprise a transition metal based copper-chelating agent (e.g., Mo, W, Va, Re) that can be incorporated into medical devices to diagnose or treat various diseased, obstructed or otherwise impaired vascular and non-vascular tissues via utilizing suitable carriers (e.g., implant/delivery device/vehicle). The copper-chelating agents can be provided (within an implant or carrier device) either in: (a) a pharmaceutically active state (in the form of a Tetrathiomolybdate $[MoS_4]^{2-}$, short 'TTM'), Oxomolybdate $[MoO_4]^{2-}$; or (b) a latent, latent, biologically passive, bioinert and/or biocompatible form, such as Molybdenum (IV) Sulfide $MoS_2$ or Molybdenum (VI) Sulfide $MoS_3$ that need to be converted physiologically to a bioactive state. Other 'latent' sources can include Oxothiomolybdates $[MoS_2O_2]^{2-}$ and/or Polyoxo- or thiomolybdates, such as $Mo_3S_9$, and the aforementioned cluster compounds, as well as organic molybdate complexes. The pharmaceutically active concentration of Molybdenum is predominantly governed by its intrinsic solubility constant in aqueous environments, and subsequently affected by metabolic pathways and biochemical reaction mechanisms. The material compositions of the present disclosure provide a biocompatible material for incorporation into medical devices undergoing self-limiting absorption, having sustained release properties, intended to prevent uncontrolled release of pharmaceutical agents.

The material composition of the present disclosure is directed to various material compositions for incorporation into a medical device, comprising: one or more transition metal chalcogenides, provided in a non-bioactive form capable of in vivo conversion into a bioactive form under physiological conditions following implantation; wherein the bioactivated transition metal chalcogenide derivatives exhibit copper-chelating activity that promotes anti-inflammatory and anti-proliferative effects on tissues surrounding the implantable device; and wherein the non-bioactivated transition metal chalcogenides are defined by:

$$M_xA_yB_z \qquad \text{(Formula I)}$$

having an index number x, y, and z that each constitute an atomic ratio of the material composition;
wherein M is a transition metal element present in an atomic ratio x of 1 or 3;
wherein A is a first chalcogenide element present in an atomic ratio y of 0 to 9;
wherein B is a second chalcogenide element present in an atomic ratio z of 0 to 9, and;
wherein a sum of the atomic ratios y and z of the first and second chalcogenide elements A and B is 2, 3, or 9, defining a first stoichiometric ratio, that is applicable, when the transition metal chalcogenide and derivatives are prepared utilizing a solution-based process; and
wherein the sum of the atomic ratios y and z of the first and second chalcogenide elements A and B, is present in the first stoichiometric ratio, or present in a second, non-stoichiometric ratio, that differs in a range from 0.01 to 20% from the first stoichiometric ratio, when the transition metal chalcogenide and derivatives are not prepared utilizing a solution-based process.

An example of transition metal chalcogenide represented in a nonstoichometric ratio is $MoS_2$ with Mo atomic content 0.8-1.2 and S atomic content 1.6-2.4, if prepared by a solvent-less process such as by vapor deposition.

Binary Molybdenum Sulfides: Examples of transition metal chalcogenides as a source for latent molybdate ions may include without limitation at least the following binary molybdenum sulfides: $MoS_2$, $MoS_3$, and $Mo_3S_9$.

Polythiometallate Clusters: Other examples of binary transition metal chalcogenide anions, preferably in their ammonium salt form, include without limitation the following sulfide anions: $[MoS_9]^{2-}$, $[Mo_2S_6]^{2-}$, $[Mo_2S_7]^{2-}$, $[Mo_2S_8]^{2-}$, $[Mo_2S_9]^{2-}$, $[Mo_2S_{11}]^{2-}$, and $[Mo_2S_{12}]^{2-}$. This exemplary list of compounds can be expanded to include ternary molybdenum sulfides as well as mixed oxide or sulfides, which are fully contemplated embodiments of the present disclosure.

Examples of transition metal sulfur clusters include without limitation the following:

Diammonium Tris (μ-Disulfido) Tris (Disulfido)-μ3-Thio-Triangulo-Trimolybdate (IV)

Hydrate $(NH_4)_2[Mo_3(S)(S_2)_6] \cdot nH_2O, n=0\text{-}2$; and

Diammonium Bis(μ-Disulfido) Tetrakis(Disulfido)-Dimolybdate (V) Dihydrate $(NH_4)_2[Mo_2(S_2)_6] \cdot 2H_2O$ Both of these cluster compounds are readily accessible. Their preparation is described in Inorganic Syntheses, Volume 27, edited by Alvin P. Ginsberg, John Wiley & Sons, Inc. 1990. Other, directly water-soluble molybdenum containing oxo- or thio- or mixed oxothio-anions may include without limitation:

| | | |
|---|---|---|
| Tetrathiomolybdate anions | $[MoS_4]^{2-}$, | (TM4) |
| Trithiooxomolybdate anions | $[MoOS_3]^{2-}$, | (TM3) |
| Dithiomolybdate anions | $[MoO_2S_2]^{2-}$, | (TM2) |
| Thiooxomolybdate anions | $[Mo_3OS]^{2-}$, | (TM1) |
| Molybdate anions | $[MoO_4]^{2-}$, | (TM0) |
| | or their respective polyanions | |

For all embodiments described herein, the Molybdenum species may be interchanged with other (adjacent) transition metal chalcogenides, and their natural and synthetic isotopes. Thus, the transition metal Molybdenum can be interchanged with Titanium, Vanadium, Chromium, Manganese, Iron, Cobalt, Zirconium, Niobium, Ruthenium, Rhodium, Palladium, Silver, Hafnium, Tantalum, Tungsten, Rhenium, Osmium, Iridium, or Platinum, and can also include chalcogenides such as Oxygen, Sulfur, and Selenium.

Although pure oxo- and thiometallate ions of the form $[M_xO_z]^{n-}$ and $[M_xS_y]^{n-}$ have been described for a greater number of transition metals, with their numerous d-electron configurations, only a few transition metals form mixed oxothiometallates $[M_xS_yO_z]^{n-}$ in d0 electron configuration. These include specifically Titanium, Vanadium, Niobium, Molybdenum, Tungsten, Technetium and Rhenium. Specifically of those, the Vanadium, Molybdenum, Rhenium and Tungsten can form chemically and structurally similar tetrathiometallates. Within this selection, the Molybdenum and Tungsten compounds have been confirmed to exhibit copper-chelating ability.

2. Material Compositions of Molybdenum Disulfide, $MoS_2$

Structural and Chemical Properties: Molybdenum disulfide, $MoS_2$ is a transition metal chalcogenide that can exhibit a layered structure comprising both of inter-layer and intra-layer bonds. The inter-layer bonds represent covalent bonds that can form between sulfur and molybdenum atoms (S—Mo—S), whereas the intra-layer bonds are weak Van-Der-Waals-London dispersive forces that can form between sulfur atoms in adjacent layers.

Reactivity: As a consequence of this specific structural feature, the hexagonal basal plane (0001) crystal faces can exhibit a non-polar, chemically passive and hydrophobic character, whereas the edge plane sites ($10\bar{1}0$ Mo, $\bar{1}010$ S) can exhibit a polar character and an ionic nature, and are chemically more reactive and more susceptible to oxidation.

Stabilty: Molybdenum disulfide, $MoS_2$ can be chemically very stable when compared to other metal sulfides. However, in aqueous media, it can undergo slow oxidation and form Molybdate anions in solution. Molybdenum disulfide suspended in water can produce a water phase (supernatant) containing $[MoO_4]^{2-}$, $[HMoO_4]^-$ and $[H_2MoO_4]$. These species can be formed by the dissolution of a surface layer of $MoO_3$:

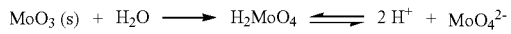

Solubility: Information on the actual quantitative solubility of solid Molybdenum disulfide can be sparse, and the compound can be often quoted as being insoluble in water. However, various studies in different media ranging from buffer media to pure water have suggested that the aqueous solubility can be measured conservatively within a range from 20-200 pg/l depending on the conditions applied. Thus, upon prolonged contact between $MoS_2$ coated surface with an aqueous medium, a saturation concentration of 0.125-1.25 μM $MoO_4^{2-}$ can reasonably be expected.

Conversion Capability of Molybdate Species in Aqueous Solution: In the presence of sulfide ions, the molybdate species $MoO_4^{2-}$ can be converted subsequently to various oxothiomolybdates and thiomolybdate species analogous to the following mechanism:

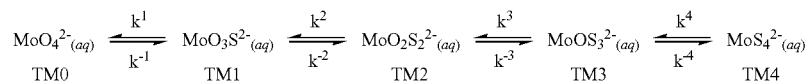

Figure 14:
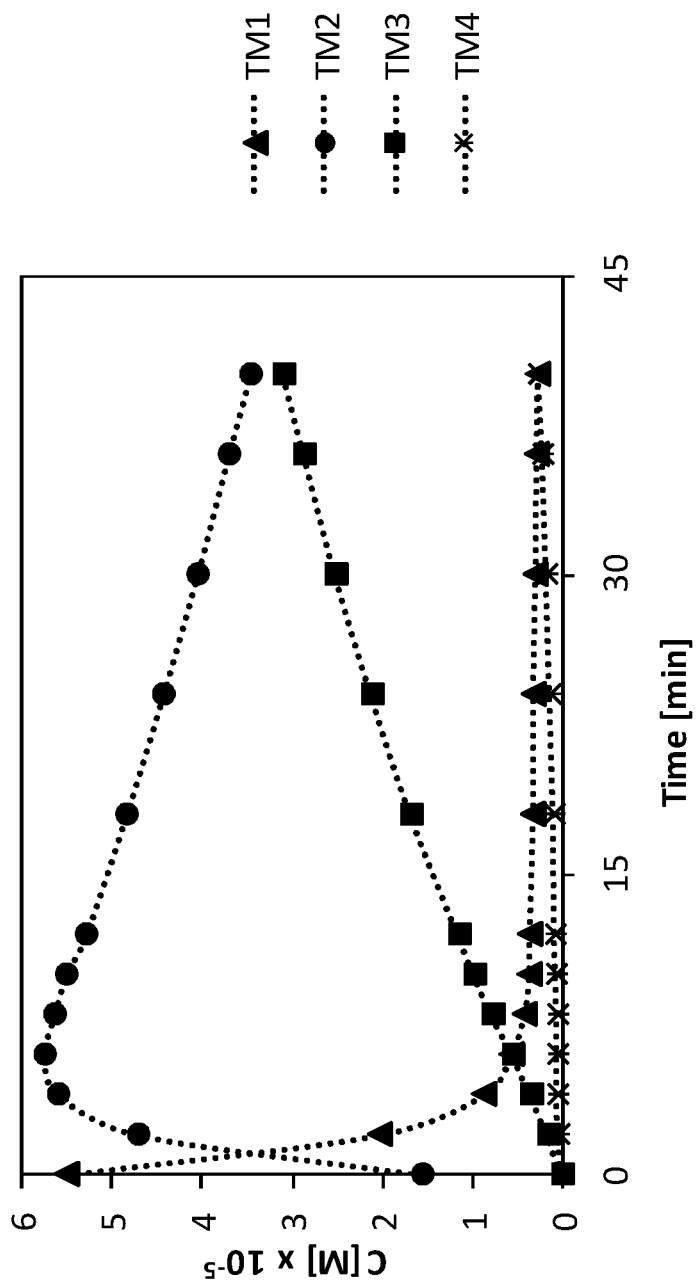
FIG. 14 is a graph that illustrates the forward thiomolybdate conversion process based on Rhett Clark, PhD. Thesis, 2008, University of Saskatchewan, Saskatoon, titled "Kinetics of Thiomolybdate and Copper-Thiomolybdate Interconversion Processes".

The forward thiomolybdate conversion process is further illustrated by FIG. 14, which demonstrates that the complex forward thiomolybdate formation process can be simplified to:

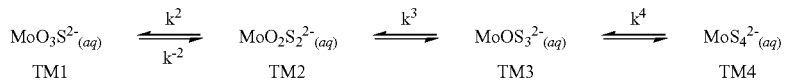

$$\underset{\text{TM1}}{\text{MoO}_3\text{S}^{2-}{}_{(aq)}} \underset{k^{-2}}{\overset{k^2}{\rightleftharpoons}} \underset{\text{TM2}}{\text{MoO}_2\text{S}_2{}^{2-}{}_{(aq)}} \overset{k^3}{\rightleftharpoons} \underset{\text{TM3}}{\text{MoOS}_3{}^{2-}{}_{(aq)}} \overset{k^4}{\rightleftharpoons} \underset{\text{TM4}}{\text{MoS}_4{}^{2-}{}_{(aq)}}$$

Also, the kinetic interconversion constants for a variety of conditions, i.e., under specified pH, ionic strength and temperature have been published by others, which are incorporated herein by reference:

TABLE 1

Kinetic interconversion constants in dependence of ionic strength

| I (M) | $k^2 \times 10^2$ | $k^{-2} \times 10^5$ | $k^3$ | $k^4$ |
|---|---|---|---|---|
| 0.15 | 2.0 | 6.1 | 5.4 | 0.54 |
| 0.20 | 2.0 | 8.0 | 5.2 | 0.47 |
| 0.25 | 2.3 | 6.0 | 6.1 | 0.48 |
| 0.30 | 2.3 | 6.1 | 5.4 | 0.50 |

T = 38° C.
pH = 7.2
k in [$M^{-1}min^{-1}$]

TABLE 2

Kinetic interconversion constants in dependence of pH

| pH | $k^2 \times 10^2$ | $k^{-2} \times 10^5$ | $k^3$ | $k^4$ |
|---|---|---|---|---|
| 7.2 | 1.45 | 0.065 | 0.033 | 0.0019 |
| 7.0 | 2.68 | 0.084 | 0.059 | 0.0024 |
| 6.8 | 5.00 | 0.17 | 0.104 | 0.0033 |
| 6.6 | N/A | N/A | 0.161 | 0.0039 |
| 6.4 | N/A | N/A | 0.191 | 0.0039 |

T = 38° C.
I = 0.26M
k in [$M^{-1}min^{-1}$]

TABLE 3

Kinetic interconversion constants in dependence of temperature

| T (° C.) | $k^2 \times 10^2$ | $k^{-2} \times 10^5$ | $k^3$ | $k^4$ |
|---|---|---|---|---|
| 25 | 1.4 | 1.1 | 4.0 | 0.27 |
| 30 | 1.6 | 0.7 | 4.1 | 0.27 |
| 38 | 2.1 | 4.0 | 5.5 | 0.23 |
| 45 | 2.4 | 8.0 | 6.2 | 0.30 |
| $E_a$ | 22 | 92 | 19 | N/A |

I = 0.15M
pH = 7.2
k in [$M^{-1}min^{-1}$]
Ea in [$kJ\ mol^{-1}\ K^{-1}$]

In vivo Formation of Tetrathiomolybdate Species: Since the driving factor for the thiomolybdate conversion process is the presence of sulfide ions, it is perceivably relevant that blood itself contains a range of 10-300 μM of $H_2S$ [Whitfield, Nathan L., PhD. Thesis, 2010, University of Notredam, Indiana, titled "Hydrogen sulfide and its potential role as an oxygen sensor"; Appendix I]. More specifically, serum from normal human subjects has been shown to contain on average 52 μM of total sulfides [Jiang H L, Wu H C, Li Z L, Geng B, and Tang C S, 2005, titled "Changes of the new gaseous transmitter $H_2S$ in patients with coronary heart disease", Di Yi Jun Yi Da Xue Xue Bao 25:951-954]. The latter blood sulfide concentration can exceed the predicted maximum aqueous saturation concentration of the molybdate species (TM0) stemming from $MoS_2$ (1.25 μM) by a factor of ~40, which is ten times the amount stoichometrically needed to convert TM0 into TM4. Erickson et al. have shown that in sulfidic solution, if the $H_2S$ (aq) concentration increases slowly enough to maintain near-equilibrium conditions, a sharp switch will occur from $MoO_4{}^{2-}$ to $MoS_4{}^{2-}$ at around 11 μM $H_2S$ (aq) (298 K, 1 atm); [B. E. Erickson et al., "Molybdenum, (VI) speciation in sulfidic waters: Stability and lability of thiomolybdates.", Geochim. Cosmochim. Acta 2000 Vol: 64:1149-1158].

Thus, when a molybdenum chalcogenide surface, or more specifically a molybdenum disulfide containing surface, comes into contact with blood, the excess sulfide concentration can aid the conversion of the molybdate species (TM0) released from the molybdenum chalcogenide surface into its intermediate environment into the respective tetrathiomolybdate species (TM4). Thereby, it is naturally conceiveable that an in vivo formation of tetrathiomolybdate can occur when molybdenum disulfide is in contact with blood.

3. Detailed Description of Embodiments

Figure 2:
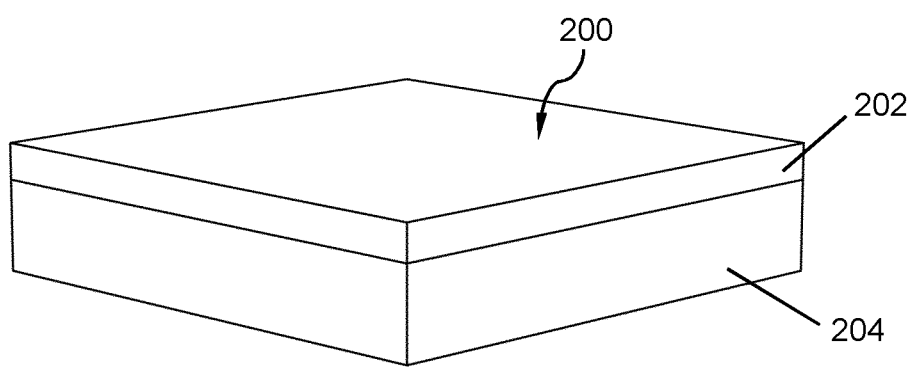
FIG. 2 is a perspective diagram of a bioactivatable medical device for a coating film comprising $M_xA_yB_z$ of Formula I over a substrate of interest, as one embodiment.

FIG. 2 is a perspective diagram of a bioactivatable medical device for a coating film comprising $M_xA_yB_z$ over a substrate of interest, as one embodiment. In FIG. 2, a hypothetical section 200 of a medical device is shown, wherein a coating film 202 comprising a transition metal chalcogenide having the formula $M_xA_yB_z$ can be deposited/formed over the substrate 204. A coating film comprising a transition metal chalcogenide can be utilized for coating any implantable device, provided that this is technically feasible. The coating thickness can range from about 0.1-1 μm, 1-5 μm, and/or 5-10 μm.

Figure 3:
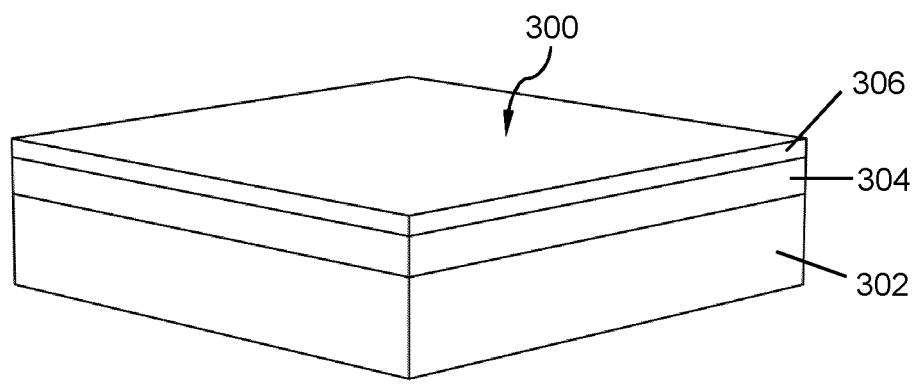
FIG. 3 is a perspective diagram of a bioactivatable medical device for which a coating film comprising $M_xA_yB_z$ of Formula I can be further modified by fluoropassivation, as one embodiment.

FIG. 3 is a perspective diagram of a bioactivatable medical device for which a coating film comprising $M_xA_yB_z$ can be further modified by fluoropassivation, as one embodiment. In FIG. 3, a hypothetical section 300 of a medical device is shown, wherein a coating film 304 comprising a transition metal chalcogenide having the formula $M_xA_yB_z$ can be deposited/formed over the substrate 302. In a subsequent step, the coating film 304 is subjected to a fluoropassivation process, in which the surface of the coating film 304 becomes further modified by the incorporation of additional reactive groups, including the addition of trifluoroethoxy-group functionalized dithiophosphonate or dithiocarbamate compounds that can introduce additional advantageous properties such as anti-thrombogenic activity. The coating thickness can range from about 0.2-1 nm, 2-10 nm, and/or 10-100 nm.

Figure 4:
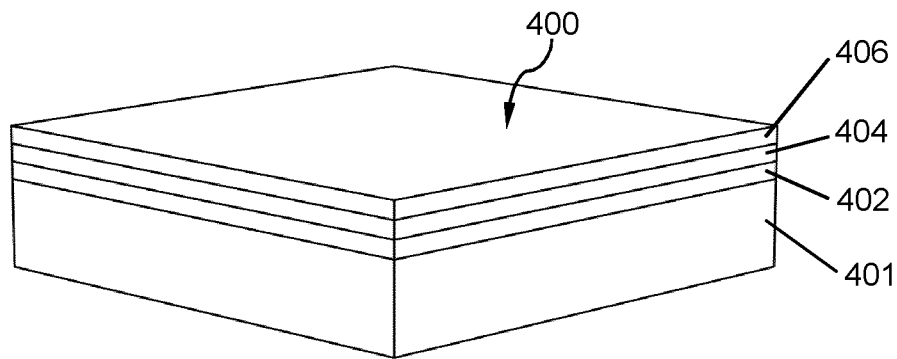
FIG. 4 is a perspective diagram of a bioactivatable medical device comprising at least 3 different $M_xA_yB_z$ of Formula I coatings over a substrate of interest, as one embodiment.

FIG. 4 is a perspective diagram of a bioactivatable medical device comprising at least 3 different $M_xA_yB_z$ coatings over a substrate of interest, as one embodiment. In FIG. 4, a hypothetical section 400 of a medical device is shown, wherein an exemplary coating of $MoS_2$ 402 can be deposited/formed over the substrate 401, which can be followed in turn by an exemplary coating layer of MoS$_3$ 404 over layer 402, which can be followed by an exemplary coating layer of MoO$_3$ 406 over layer 404. The thickness of each coating layer can range from about 0.1-1 μm, 1-5 μm, and/or 5-10 μm.

Figure 5:
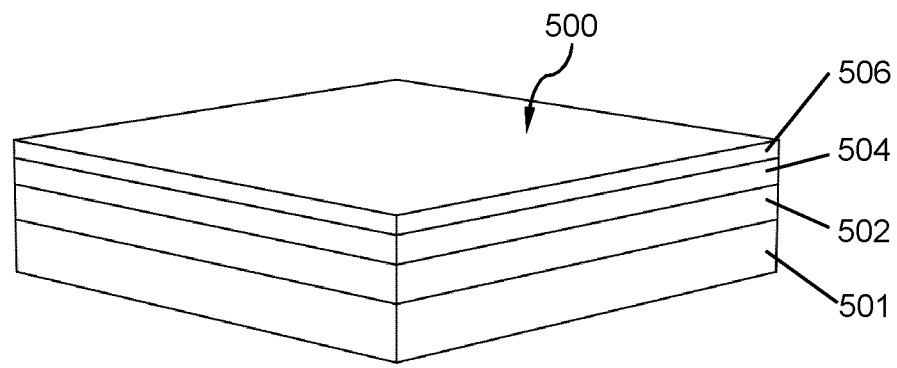
FIG. 5 is a perspective diagram of a bioactivatable medical device comprising at least 3 different $M_xA_yB_z$ of Formula I coatings over a substrate of interest, as one embodiment.

FIG. 5 is a perspective diagram of a bioactivatable medical device comprising at least 3 different M$_x$A$_y$B$_z$ coatings over a substrate of interest, as one embodiment. In FIG. 5, a hypothetical section 500 of a medical device is shown, wherein an exemplary coating of MoS$_2$ 502 can be deposited/formed over the substrate 501, which can be followed in turn by an exemplary coating layer of MoS$_{2.4}$ 504 over layer 502, which can be followed by an exemplary coating layer of MoS$_3$ 506 over layer 504. The thickness of each coating layer can range from about 0.1-1 μm, 1-5 μm, and/or 5-10 μm.

Figure 6:
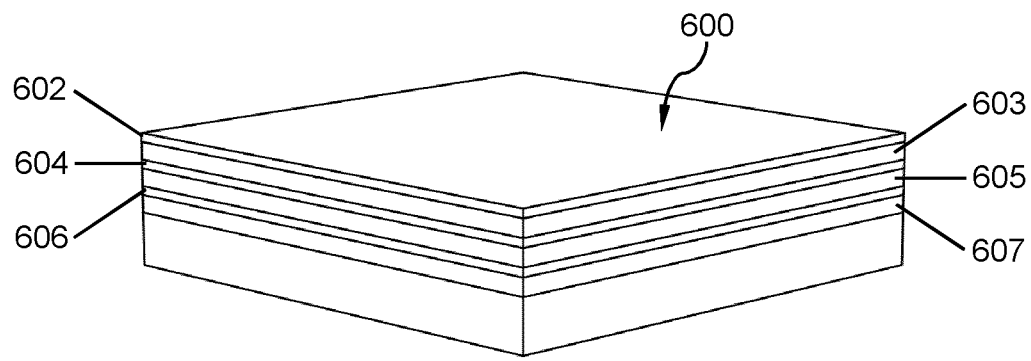
FIG. 6 is a perspective diagram of a bioactivatable medical device comprising at least 2 different $M_xA_yB_z$ of Formula I coatings that can be arranged alternately over a substrate of interest, as one embodiment.

FIG. 6 is a perspective diagram of a bioactivatable medical device comprising at least 2 different M$_x$A$_y$B$_z$ coatings that can be arranged alternately over a substrate of interest, as one embodiment. In FIG. 6, a hypothetical section 600 of a medical device is shown, wherein a first type of exemplary coating comprising MoS$_2$ can be deposited/formed over a substrate as layers 603, 605, and 607, which can be arranged alternately with respect to a second type of exemplary coating comprising MoO$_3$ that can be deposited/formed as layers 602, 604, and 606. The thickness of each coating layer can range from about 0.1-1 μm, 1-5 μm, and/or 5-10 μm.

Figure 7:
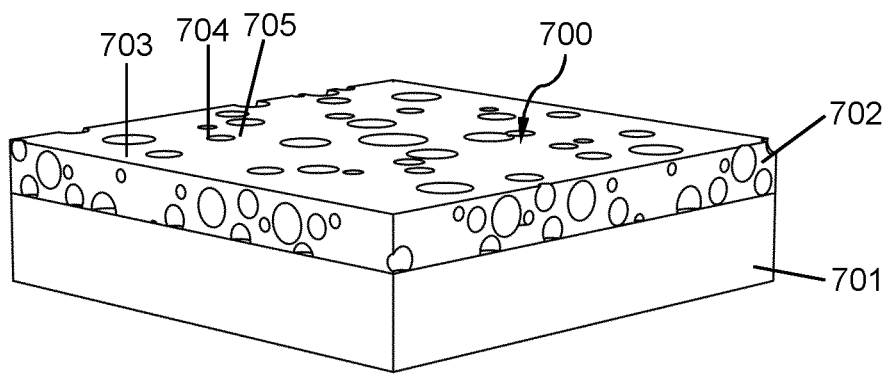
FIG. 7 is a perspective diagram of a bioactivatable medical device comprising a closed-cell porous $M_xA_yB_z$ of Formula I coating layer over a substrate of interest, as one embodiment.

FIG. 7 is a perspective diagram of a bioactivatable medical device comprising a closed-cell porous M$_x$A$_y$B$_z$ coating layer over a substrate of interest, as one embodiment. In FIG. 7, a hypothetical section 700 of a medical device is shown, wherein a closed-cell porous coating film 702 comprising a transition metal chalcogenide having the formula M$_x$A$_y$B$_z$ can be deposited/formed over the substrate 701, in which the pores of the coating film represented as 703, 704, and 705 can be filled with one or more pharmaceutical agents. A coating film comprising a transition metal chalcogenide can be utilized for coating any implantable device, provided that this is technically feasible. The coating thickness can range from about 0.1-1 μm, 1-5 μm, and/or 5-10 μm.

Figure 8:
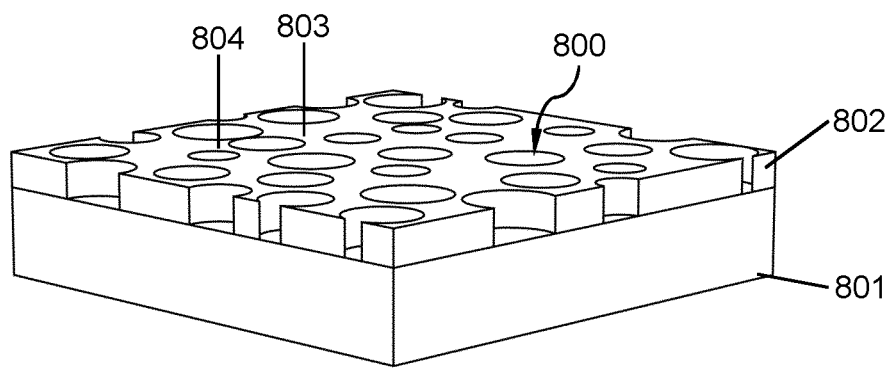
FIG. 8 is a perspective diagram of a bioactivatable medical device comprising an open porous $M_xA_yB_z$ of Formula I coating layer over a substrate of interest, as one embodiment.

FIG. 8 is a perspective diagram of a bioactivatable medical device comprising an open porous M$_x$A$_y$B$_z$ coating layer over a substrate of interest, as one embodiment. In FIG. 8, a hypothetical section 800 of a medical device is shown, wherein an open porous coating film 802 comprising a transition metal chalcogenide having the formula M$_x$A$_y$B$_z$ can be deposited/formed over the substrate 801, in which the pores of the coating film represented as 803, and 804 can be filled with one or more additional diagnostic, therapeutic and/or pharmaceutical agents. A coating film comprising a transition metal chalcogenide can be utilized for coating any implantable device, provided that this is technically feasible. The coating thickness can range from about 0.1-1 μm, 1-5 μm, and/or 5-10 μm.

Figure 9:
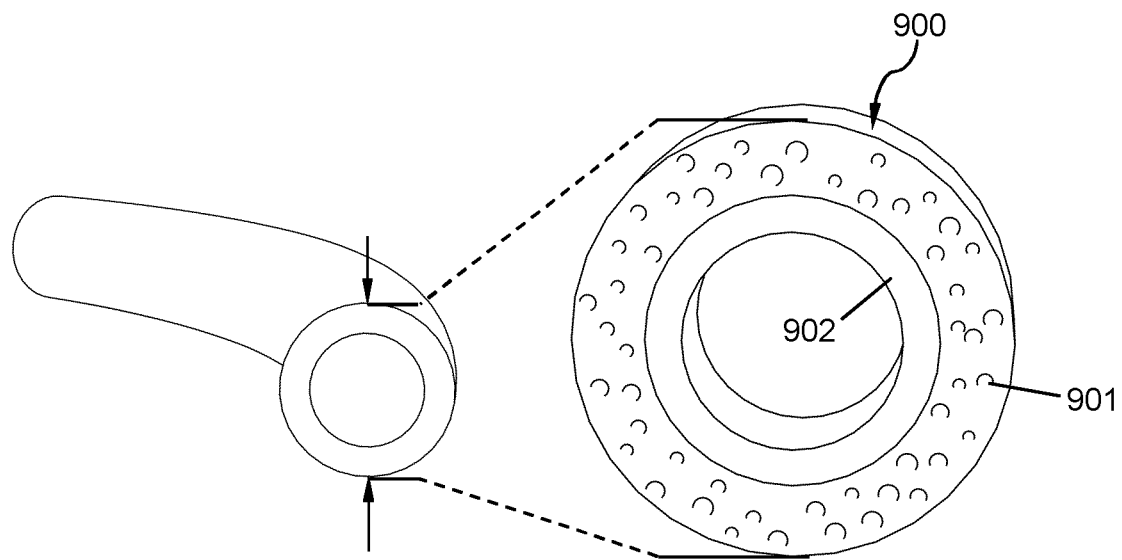
FIG. 9 is a diagram of a bioactivatable medical device shaped as a tubing, in which a portion is expanded as a perspective cross-sectional diagram of a dual-layer configuration comprising a transition metal chalcogenide formed as an outer layer, as one embodiment.

FIG. 9 is a perspective diagram of a bioactivatable medical device having a dual-configuration and shaped as a tubing, and comprising a transition metal chalcogenide, as one embodiment. In FIG. 9, a hypothetical implantable device 900 in a tubing configuration is shown, wherein a particulate matrix 901 comprising M$_x$A$_y$B$_z$, such as MoS$_2$, can be embedded into the hypothetical implantable device comprising a polymeric tubing 900, in which the lumen is shown as 902.

Figure 10:
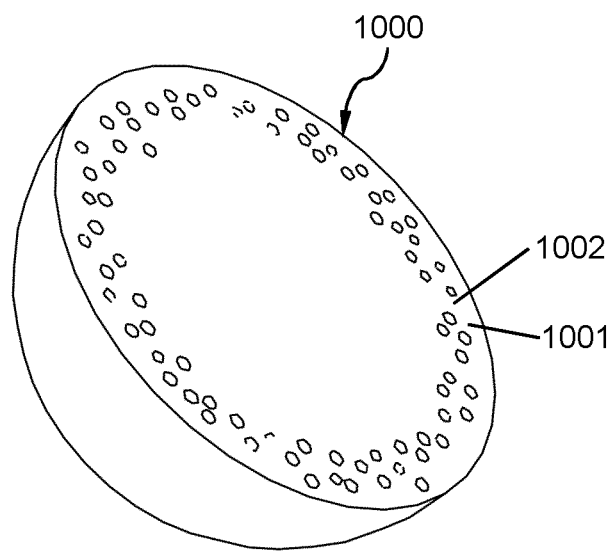
FIG. 10 is a perspective diagram of a cross-section of an embolic microsphere particle loaded with particulates of transition metal chalcogenides, as one embodiment.

FIG. 10 is a perspective diagram of a cross-section of an embolic microsphere particle loaded with particulates of transition metal chalcogenides, as one embodiment. In FIG. 10, a hypothetical embolic microsphere 1000 is shown, wherein particulates 1001 and 1002 comprising M$_x$A$_y$B$_z$, such as MoS$_2$, can be loaded into the embolic microsphere 1000.

Figure 11:
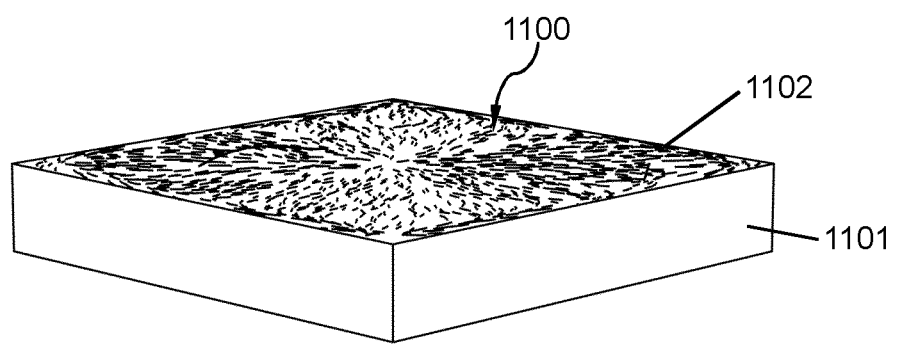
FIG. 11 is a perspective diagram of a bioactivatable medical device comprising an $M_xA_yB_z$ transition metal chalcogenide of Formula I formed as a fibrous coating over a substrate of interest, as one embodiment.

FIG. 11 is a perspective diagram of a bioactivatable medical device comprising an M$_x$A$_y$B$_z$ transition metal chalcogenide of Formula I formed as a fibrous coating film over a substrate of interest, as one embodiment. In FIG. 11, a hypothetical section 1100 of a medical device is shown, wherein a matrix of fibres 1102 comprising a transition metal chalcogenide having the formula M$_x$A$_y$B$_z$ can be deposited/formed over the substrate 1101.

EXAMPLES

The following examples provide the various embodiments contemplated and include specific examples of coating formulations suitable for manufacturing medical devices and specific examples of coating methods/processes to enable persons skilled in the art to practice the scope of the disclosure. Alternative formulations and methods/processes known to persons skilled in the art are fully contemplated in the absence of explicit disclosure.

For all embodiments and following examples of this disclosure, the contemplated molybdenum species may be interchanged with other adjacent transition metal chalcogenides, including their natural and synthetic isotopes. Thus, the transition metal molybdenum can be exchanged, for example, by tungsten, vanadium, rhenium, titanium, chromium, manganese, iron, cobalt, zirconium, niobium, ruthenium, rhodium, palladium, silver, hafnium, tantalum, osmium, iridium, or platinum, and can also include chalcogenides such as oxygen, sulfur, selenium, tellurium, antimony and/or arsenic. The following overview is provided for guidance:

EXAMPLES 1-13 provide embodiments relating to methods for incorporating transition metal chalcogenides into medical device substrates.

EXAMPLES 1-3 provide embodiments relating to deposition processes suitable for the formation of substantially solvent-borne transition metal chalcogenides.

EXAMPLES 4-9 provide embodiments relating to deposition processes suitable for the formation of substantially solvent-free transition metal chalcogenides.

EXAMPLES 10-13 provide embodiments for incorporating transition metal chalcogenide species as part of medical devices, for use in the form of various hydrogels.

EXAMPLES 14-19 provide embodiments for incorporating transition metal chalcogenide species as part of medical devices, for use in the form of various physical morphologies.

EXAMPLES 20-35 provide embodiments for incorporating transition metal chalcogenide species as part of medical devices, by providing specific configurations of transition metal chalcogenides.

EXAMPLES 36-43 provide embodiments for incorporating metal chalcogenide species into specific medical devices for providing a number of device-specific advantages.

Example 1

ATTM-Based Stent Coatings

Example 1 provides (a) exemplary coating formulations for stents comprising ATTM having copper chelating activity; (b) exemplary methods for coating deposition; (c) implant surface preparation; (d) analysis of coating integrity, and related methods. FIG. 2 refers to a hypothetical coating embodiment, which can be relevant to the application of ATTM coating over stents.

Preparation of Exemplary Coating Formulations: $(NH_4)_2MoS_4$ ("ATTM" or ammoniumtetrathiomolybdate) as a representative compound for a pharmaceutically active copper chelating agent can be dissolved in a suitable solvent including, without limitation dimethyl acetamide, dimethylsulfoxide or tetramethylurea to provide a desired saturation concentration. ATTM has been shown to exhibit limited solubility in acetone, acetonitrile, cyclohexanone, methylisobutylketone and reasonable solubility in dimethylacetamide, tetramethylurea, dimethylsulfoxide, N-methylpyrrolidone, ethylendiamine, pyridine, methanol, ethanediol and water. Concerning organic solvents, dimethylacetamide, tetramethylurea, ethanediamine and ethanediol can exhibit substantial solvation power for ATTM, and constitute preferred solvents for carrying out wet-chemical dissolution, homogenization, blending, suspension and precipitation processes. The concentrated ATTM solution can be mixed with a variety of suitable matrix polymers commonly known to one of ordinary skill in the art, including, without limitation PVDF-HVP, PET, PLGA, PLLA, PHA, polyurethanes, polyphosphazenes, silicones and equivalents, in a suitable volume ratio to form a readily available coating formulation with a defined polymer to ATTM weight ratio per ml coating formulation. The matrix polymer solvent can be chosen to be mutually compatible with the ATTM solvent in order to avoid potential phase separation. The obtained deep red to orange solution can be centrifuged, and the supernatant filtered through a 0.22 μm PTFE filter to remove any solid residue. The finally obtained ATTM concentration can be determined via UV-Vis spectroscopy.

Exemplary Coating Formulation 1: As one exemplary formulation, following the outlined procedure, 10 mg ATTM can be provided in 1 ml tetramethylurea and combined with 1 ml of a solution containing 30 mg PVDF-HVP in tetramethylurea. After blending and filtering the solution, a coating formulation containing 5 mg ATTM and 15 mg PVDF-HFP per ml tetramethylurea can be obtained.

Exemplary Coating Formulation 2: As another exemplary formulation, following the outlined procedure, a solution of 20 mg/ml poly [bis(2,2,2-trifluoroethoxy) phosphazene] in dimethylacetamide can be combined with a saturated solution of ATTM in dimethylacetamide to obtain an ATTM concentration in the polymer coating solution of 1 weight %.

Implant Cleaning: CoCr-alloy based stents can be cleaned by 10 min ultrasonication in a mixture of 50 (v/v) isopropanol, 30 (v/v) % ultrapure water and 20 (v/v) % acetic acid, rinsed with ultrapure water and 100% Isopropanol, and air-dried.

Implant Coating: Cleaned CoCr-alloy based stents can be dip-coated with the exemplary coating formulation 2 to yield a poly(bis(2,2,2-trifluoroethoxy)phos phazene) coating of 100 μg/cm² with an overall ATTM content of 50 μg per coating.

Exemplary Coating Processes: Standard coating techniques known to persons skilled in the art include the solvent-borne coating processes that can: (a) dissolve a substance material in a suitable solvent for use as a coating formulation, selected for compatibility with both substrate and solute; and (b) apply the coating formulation in one or more consecutive steps to the substrate of interest. Without limitation, the coating formulation can be applied to the coating substrate(s) by utilizing, for example, dip-coating, immersion-coating, spray-coating, spin-coating, electrospinning and equivalent processes. In order to create a homogenous or heterogeneous coating formulation for obtaining the desired coating for a substrate of interest, the coating formulation can: (a) be adjusted to provide desirable solution viscosity, content of dissolved solids or solute concentration; (b) include solvents of variable compositions; (c) include co-solvents or non-solvents to control evaporation rate and onset or absence of phase separation; and (d) include additional fillers, additives, helping agents, surfactants, dispersants, emulsifying agents and equivalents. Such coating processes can be carried out as a single or multiple coating cycle(s) to confer the desired coating thickness and morphology. The targeted substrate surface can be selected from any arbitrary material and can be formed to any surface morphology. The coating deposition rate can be adjusted with process-specific parameters, for example, by selecting a suitable concentration, spray pressure, coating liquid pump or feed rate, substrate withdrawing speed and/or other process-specific equivalents. The coatings can be obtained upon evaporation of the solvent or solvent mixture, which can be assisted by selecting suitable temperature and pressure conditions, and/or applying dry and/or inert gases.

Quantification of ATTM: Quantification of released amounts of ATTM can be accomplished with a UV-Vis spectrometer in the wavelength interval between 320-190 nm at a scanning speed of 60 nm/min and an aperture of 0.5 nm against a blank sample of ultrapure water. The molar extinction coefficient can be determined with calibrated sets of aqueous standard solutions prepared in the concentration range of 0.08-13 μg/ml.

Release Experiment: An ATTM coated implant or stent can be prepared using the exemplary coating formulation 2 and eluted in a closed loop circuit containing 50 ml of ultrapure water. Absorbance change can be recorded at 241.5 nm by a flow through quartz cuevette interposed in the loop. The flow rate of the circuit can be controlled by a peristaltic pump set to 500 μl per minute, while the measurements can be taken at intervals of 1/min for a total period of 72 h. The coating formulations comprising a transition metal chalcogenide, capable of copper chelation upon in vivo activation, can be deposited by following the solvent-borne coating processes as described above.

Experimental Results: Experiments on ATTM-eluting polymer films have been previously conducted by the inventor of the present disclosure and published in "Biocompatible polymer films for cell manipulation and controlled drug delivery", Dissertation, University of Heidelberg, 2006, pages 100-102, which are incorporated herein by reference and described hereafter. The elution rate for stent samples coated with ATTM-eluting polymer films was measured in a controlled environment, in which "a total of 4.7 μg ATTM was released from the coated stent within a period of 4 days" for a sample volume of 50 ml, and 1.3 μg ATTM was released within the first 60 min. Afterwards, the drug was eluted at a rate of 0.85 μg/day. Thus, based on this preliminary experimentation utilizing the disclosed exemplary coating formulation 2, it is reasonable to expect that an exemplary device loaded with 50 μg of a pharmacologically active, copper-chelating agent of the present disclosure per implant could demonstrate dissolution/elution over a period of approximately two months. For clinical efficacy, it is desirable to provide a coating formulation exhibiting pharmacological activity that can extend through the minimal therapeutic period necessary for obtaining therapeutic end points and/or the intended implantation period.

Coatings of Transition Metal Chalcogenides for Medical devices: The present inventor concluded that coating formulations comprising copper-chelating agents, such as ATTM, provided in readily soluble and bioactive form having pharmacological activity may be less suitable as an option for drug-release applications for prolonged implantation duration, and thus, identified the need for innovating improved coating formulations of copper-chelating agents for medical devices that can perform for the intended therapeutic period. The potential use of transition metal chalcogenide for therapeutic applications can be limiting in that the high solubility of such substances in aqueous solutions and high systemic bioavailability are less likely to permit long-term activity. Thus, various formulations comprising one or more transition metal chalcogenides that can exhibit lower levels of aqueous solubility can be more suitable for use as drug-release formulations for various medical devices, in which the drug-release rate can be controlled or modulated to satisfy the clinical requirements.

The transition metal chalcogenides most suitable for incorporation into medical devices are capable of undergoing chemical conversion from a non-bioactive state when provided in stable form to a bioactive state when converted in vivo as a readily soluble form having pharmacological activity, involving a series of reactions that occur under physiological conditions wherein the non-bioactive form of the transition metal chalcogenides of interest undergoes subsequent reactions of oxidation, dissolution, physiological metabolization, and conversion, similar to the conversion of pro-drugs, pre-cursors and equivalents.

In one embodiment, this coating formulation composed of transition metal chalcogenide can be stably formulated and deposited in a non-bioactive form onto any surface of interest, designed to be converted in vivo into a bioactive form having pharmacological activities under physiological conditions.

In another embodiment, this coating formulation composed of transition metal chalcogenide can be stably formulated and deposited in a non-bioactive form within the sub-surface volume portion(s) of medical devices.

In another embodiment, this coating formulation composed of transition metal chalcogenide can be stably formulated and deposited in a non-bioactive form within one or more polymeric matrices applied to an implant surface, by the application of any coating process known to persons skilled in the art, including a liquid based, solvent-borne (dip-coating) process utilizing substantially organic solvents.

Example 2

Wet-Chemical Film Preparation Comprising $Mo_xS_y$, $Mo_xO_z$, and $Mo_xS_yO_z$

EXAMPLE 2 and EXAMPLE 3 represent variations of embodiments presented in EXAMPLE 1, wherein a coating composition comprising readily soluble form(s) of tetrathiomolybdate compound(s) can be incorporated into the surface and/or the volume of a medical device, with or without (polymeric or non-polymeric) matrix material, and with or without involving a thermal decomposition process.

Thus, in a first deposition step, tetrathiomolybdates can be obtained in the form of a film or a layer directly over the substrate surface (Example 2), or obtained in finely dispersed form incorporated within the substrate volume (Example 3). By a second thermal decomposition process step, carried out consecutively or in parallel, these soluble transition metal chalcogenide species, can be converted into different transition chalcogenide species of lower solubility, not amenable for coating or dispersal homogeneously by solvent borne processes, but which can be more suitable for use in localized drug-release formulations.

Solvent-less Coating Processes: Instead of applying a liquid-based, solvent-borne coating process, these coating or deposition processes can also be performed in the absence of liquid solvents. A variety of solvent-less coating techniques exist and are well known to persons skilled in the art, including without limitation Physical Vapor Deposition (PVD), Chemical Vapor Deposition (CVD), Plasma-Enhanced (PECVD) or Plasma-Assisted Chemical Vapor Deposition (PACVD), Pulsed Laser Deposition (PLD), Closed-Field Unbalanced Magnetron Sputtering (CFUBMS), High Power Impulse Magnetron Sputtering HPIMPS, Thermal-evaporation, e-Beam-evaporation or Arc-Evaporation, Ion-bombardment of suitable target materials, and equivalents.

An ATTM solution can be prepared as referenced above in EXAMPLE 1 using ethanediamine or ethanediol as a solvent in a solution having a concentration in the range of 0.05 up to 1.5 M. The solution can be applied onto the desired substrate using one or more standard coating techniques known to persons skilled in the art, including, without limitation, dip-coating, spray-coating or spin-coating, whereas the coating process can be carried out in a single or in multiple coating cycle(s) to confer the desired coating thickness. The targeted substrate surface can be composed of any arbitrary implant material and surface morphology. If the surfaces forming the implant, or parts thereof, are of porous character, the coating solution can also be infused into the porous matrix by capillary action. After evaporation of the solvent, a pure $(NH_4)_2MoS_4$ film without a polymer matrix can be obtained on the desired substrate, implant surface, and morphology, respectively.

For the $MoS_3$ film preparation, the $(NH_4)_2MoS_4$ can be thermally decomposed in a thermal range of 150-200° C. within an inert argon or nitrogen atmosphere. If $MoS_2$ film preparation is desired, the temperature can be raised beyond 200° C., or more preferably, above 300° C., and most preferably above 600° C., to achieve complete decomposition within a desired time period, within an inert argon or nitrogen atmosphere. The chosen temperature range can be adapted to comply with substrate temperature susceptibility. The process can be carried out either in an inert atmosphere or vacuum. For inert gases, argon or nitrogen can be chosen. If the process is carried out in vacuum, the preferable vacuum pressure range is from $10^{-6}$ up to 102 mbar. For $MoO_3$ or $MoO_2$ film preparation, these procedures can be carried out in the presence of an oxygen environment at a desired $O_z$ partial pressure. FIG. 2 refers to a hypothetical coating embodiment, which can be relevant to the incorporation of $MoO_3$ and/or $MoO_2$ as a coating film over a substrate of interest.

Alternatively, the wet chemical MOD process can be carried out in the presence of polymeric, metallic, or ceramic matrices. Other variations of the process include changing the ammonium cation, e.g., to an $NR_{4^+}$ species or the anion to a $WS_4^{2-}$ species etc., or changing solvent, deployed temperature profiles, and/or environment, respectively. Also, these procedures may be carried out sequentially or in parallel, or partially or fully, to yield mixed or layered or gradient transition metal chalcogenide films of variable composition and dimension.

Example 3

Wet-chemical $Mo_xS_y$ or $Mo_xO_z$ or $Mo_xS_yO_z$ Particulate Preparation EXAMPLE 3 provides processes producing variable forms of transition metal chalcogenide species. The decomposition process of EXAMPLE 2 can also be carried out using one or more mixable or non-mixable solvent phases in the presence of a suitable surfactant while stirring. Such surfactants are known to persons skilled in the art, and can include, for example, long-chain carboxylic acids, or when specifically directed towards a transition metal chalcogenide species, such as $MoS_2$, other functional groups, for instance thiophosphates, dithioxanthogenates and equivalents.

In the presence of surfactants, one or more of the participating solvents can form a normal or inverse phase emulsion, suspension or colloidal solution. Upon slow evaporation of the one or more solvents, the process of which can be carried out at cryogenic temperatures, room temperature or elevated temperatures, and higher, standard or reduced pressures, or a combination thereof, the formerly dissolved molybdenum species can be precipitated in substantially macro-, micro-, meso- or nanoparticulate forms.

The latter particulates can then subsequently be heat-treated to cause thermal decomposition of the molybdenum species according to EXAMPLE 2. Depending on the calcination-, respectively conversion- or decomposition degree, and selected temperature and time frame, the particulate species can be obtained in porous, semi-porous or non-porous forms, and exhibit a variable composition as described in EXAMPLE 1. The particulate species can be obtained in substantially size-calibrated form, i.e., with a desired size distribution by the process of sieving, size-separation, centrifugation and/or filtration.

Example 4

Thermal Evaporation by Carrier Gas

EXAMPLE 4 provides a method for thermal evaporation of a transition metal chalcogenide, $MoS_2$, onto a desired substrate. A $MoS_2$ in powder form can be placed into a ceramic vessel capable of withstanding elevated temperatures beyond 1000° C., e.g., an alumina boat and transferred into a quartz tube furnace. Substrates to be coated can be placed inside the furnace at a desired distance downstream from the ceramic vessel containing the $MoS_2$ source. The quartz tube can be pumped down to a pressure of 25 mBar and back-flushed with argon several times to remove oxygen. The furnace temperature can be then raised to 850-950° C., while maintaining the substrate temperature downstream at 600-700° C. The argon carrier gas can be introduced into the chamber at a rate of approximately 20 ml/min at a reduced pressure of 25 mBar. The thermally evaporated $MoS_2$ can slowly deposit onto the cooler substrate by means of the carrier gas with basal plane orientation in parallel to the substrate surface. FIG. 2 refers to a hypothetical coating embodiment, which can be relevant to the incorporation of $MoS_2$ as a coating film over a substrate of interest.

Example 5

Pulsed Laser Deposition Based Physical Vapor Deposition

EXAMPLE 5 provides a method for a pulsed laser deposition of a transition metal chalcogenide target, $MoS_2$, onto a desired substrate. Samples can be placed in a high vacuum chamber. The chamber can be pumped down, flushed with argon, while repeating the process 1-3 times to achieve an inert gas atmosphere with substantially no oxygen traces present, to prevent potential oxidation processes. Consecutively the chamber containing the samples to be coated can be pumped down to the intended working vacuum pressure, preferably in a range from 10-7 to $10^{-2}$ mbar. The samples may be positioned on rotatable sample holders or trays. A solid state $MoS_2$ target in cylindrical or other form can be irradiated with one or more high intensity, pulsed UV laser beams. The resulting plasma beams containing the atomized molybdenum species can be directed towards the substrate surfaces to be coated. The samples can be coated at a rate of 1-10 nm/s layer thickness per second, using laser energies of up to 1J/pulse and a pulse frequency of up to 300 kHz. The typical layer thickness can be intended to range from approximately 10-1000 nm, depending on desired purpose. Variations of the process can include multiple targets of variable chemical composition, tune-able laser energy, and differing spatial arrangements of incident laser beam, resulting plasma beam and orientation of samples, as well as consecutively arranged coating processes to obtain one or more multi-layered configurations of varying layer thickness, layer composition, morphology and/or hardness. FIG. 2 refers to a hypothetical coating embodiment, which can be relevant to the incorporation of $MoS_2$ as a coating film over a substrate of interest.

Example 6

High Power Impulse Magnetron Sputtering-Based Physical Vapor Deposition

EXAMPLE 6 provides a method for a high power impulse magnetron sputter process of a transition metal chalcogenide target, $MoS_2$, onto a desired substrate. Samples can be placed in the chamber of a magnetron based PVD system. The chamber can be pumped down, flushed with argon, repeating the process 2-3 times in order to achieve an inert gas atmosphere with substantially no oxygen traces present, to prevent potential oxidation processes. Consecutively, the chamber containing the samples to be coated can be pumped down to the intended working vacuum pressure, preferably in a range from $10^{-7}$ to $10^{-2}$ mbar. The samples may be positioned on rotable sample holders or trays. A solid state $MoS_2$ target can be subjected to a high power impulse magnetron sputtering process. Variations of the process include multiple targets of variable chemical composition, tune-able pulsing power and frequency, and differing spatial arrangements of magnetron sputter source and sputter target, resulting plasma beam and orientation of samples, as well as consecutively arranged coating processes to obtain one or more multi-layered configurations of varying layer thickness, layer composition, morphology and/or hardness. The typical layer thickness can be intended to range from approximately 0.001-10 μm, more preferably 1-10 μm, and most preferably 2-4 μm, depending on desired purpose.

Additional process variations include specific process, substrate or target temperatures ranging from cryogenic up to elevated temperatures, for example, from 25 to 150° C., or from 280 to 380° C., or beyond. Also, a static or dynamic, positive or negative bias voltage can be applied to the substrate, which may include ranges from (−100) V up to +100 V. Such bias voltages can be used to facilitate film composition control (sulfur recombination on the surface), and beam directional guiding means. The described PVD processes can be preceded by plasma-based substrate surface cleaning and activation processes, and complemented or accompanied by subsequent or parallel CVD processes, i.e., in order to further modify the substrate surfaces before, during and/or after one or more layers of the molybdenum species have been deposited. Also, CVD enables the use of reactive gases for enhanced surface modification, which may include without limitation Ar, $N_2$, $H_2S$, $O_2$ and $H_2O$ as well as small organic molecules. An accompanying CVD process for instance may be used to specifically support the formation of stoichometric or non-stochiometric transition chalcogenide films. FIG. 2 refers to a hypothetical coating embodiment, which can be relevant to the incorporation of $MoS_2$ as a coating film over a substrate of interest.

Example 7

Closed-Field Unbalanced Magnetron Sputtering-Based Physical Vapor Deposition

EXAMPLE 7 provides a method for a closed field unbalanced magnetron sputter process of a transition metal chalcogenide target, $MoS_2$, onto desired substrates and additional embodiments for incorporating transition metal chalcogenide species as part of a medical device, for use on Titanium and/or NiTi based implants, including for example, Oesophagus stents, Trachea stents, Peripheral Stents, IVC Filters, Peripheral access devices, Coils, Clips and equivalents.

Figure 13:
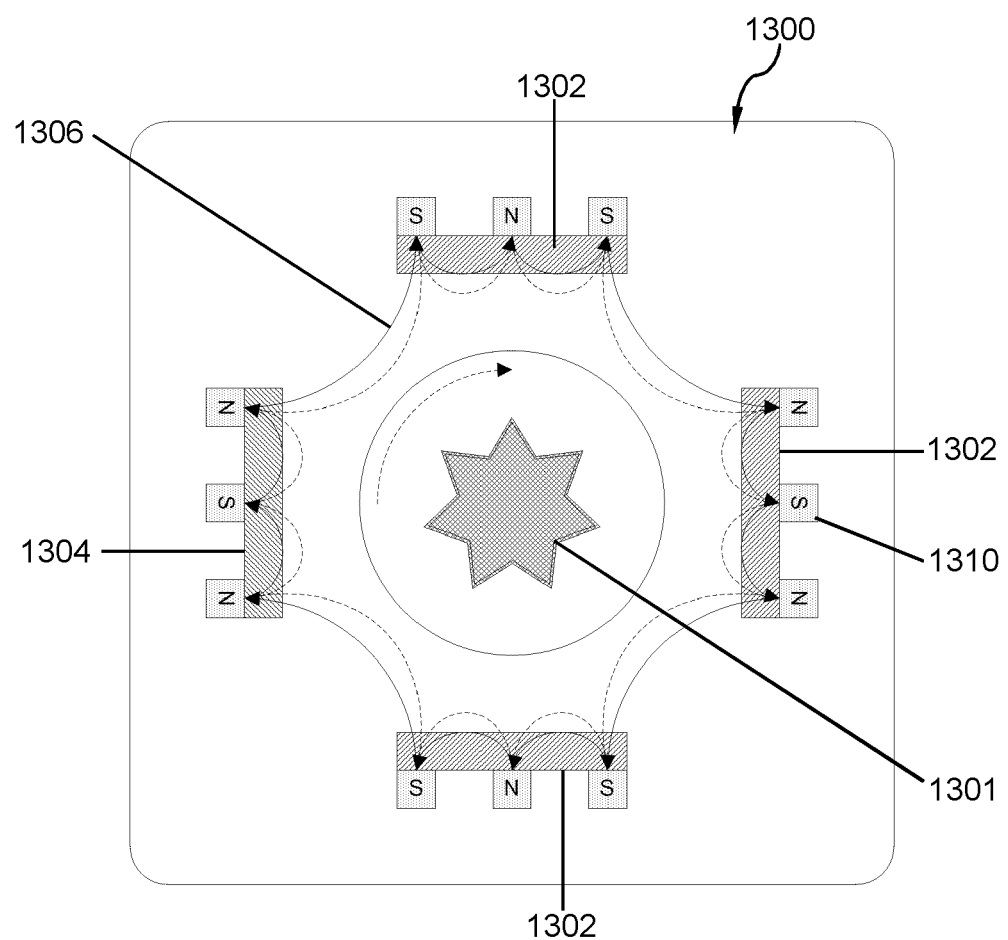
FIG. 13 is a diagram of a coating chamber configuration for magnetron sputter deposition of $M_xA_yB_z$ transition metal chalcogenide coating layers of Formula I, as one embodiment.

Implant substrates comprising Nickel Titanium alloy can be subjected to a closed field unbalanced magnetron sputtering process as follows. The sputtering system can comprise of one or more magnetrons, spatially positioned to surround the implant substrate at a desired distance, whereas the magnetrons can be configured oppositely polarized in order to form a closed-field capable of directing a comparatively high strength ionic current towards the substrate material for efficient layer deposition. The substrate holder can be configured to rotate at a desired speed to homogenously or heterogeneously expose the substrate toward the ion current. An example for the deposition chamber configuration is described in FIG. 13. In FIG. 13, the closed magnetic field line configuration of the coating chamber 1300 is indicated by double-sided arrows 1306, whereas individual magnetron polarization direction is shown as indicated through the elements 1310. One or more of the magnetron sputter targets 1302 can contain the desired transition metal chalcogenide species, whereas other target materials 1304 can comprise of other transition metals, optionally provided for modifying additional functional aspects of the coating, such as to improve adhesion and/or to effect a desired change of coating density, hardness, and morphology. The coating can be provided onto the respective implant 1301 in a variety of forms and can include amorphous, gradient, layered or multi-layered configurations with basal, columnar and/or mixed morphologies.

Coating parameters can include for example a sample rotation speed of 0-10 rpm, a distance between target and substrate of 100-200 mm, a negative bias of 30-50 V (AC, DC, pulsed DC or RF), a pressure range of $10^{-2}10^{-5}$ mbar, and currents for the individual targets in ranges of: Ti target 0.1-0.8 A, $MoS_2$ target 0.1-0.6 A, and a deposition temperature <200° C. Such described equipment and processes are readily commercially available.

Figure 19:
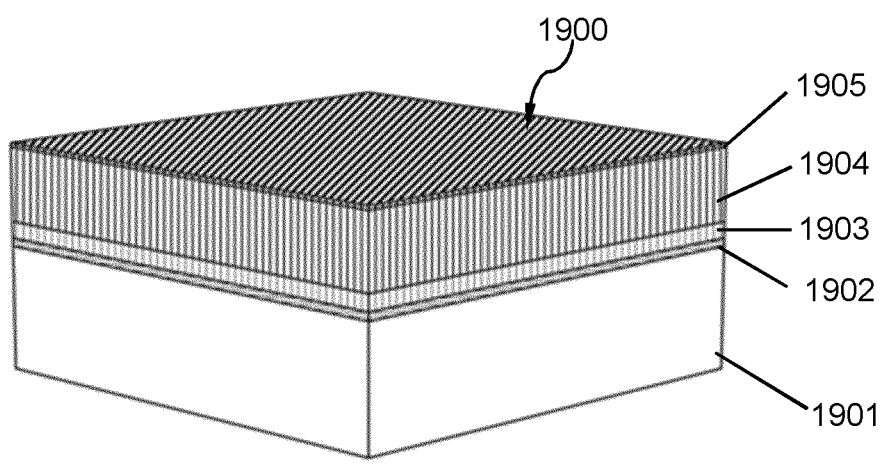
FIG. 19 is a perspective diagram of a bioactivatable medical device surface comprising multiple $M_xA_yB_z$ transition metal chalcogenide coating layers of Formula I, each containing a variable atomic ratio of titanium formed over a substrate of interest, as one embodiment.

For example, a NiTi substrate can be coated with 100 nm Titanium to serve as an adhesion promoting layer, followed by a first 200 nm thick $MoS_2$/Ti interlayer, a second $MoS_2$/Ti interlayer in the range of 800-1000 µm, and a final 50 nm pure $MoS_2$ layer, whereas the atomic ratio of S:Mo ranges from 1.5-2.2, and the ratio of Ti:Mo can be 0.01-20%. FIG. 19 is a perspective diagram of such a bioactivatable medical device surface comprising multiple $M_xA_yB_z$ transition metal chalcogenide coating layers of Formula I, each containing a variable atomic ratio of titanium formed over a substrate of interest, as follows: A 0.1 mm Nitinol substrate layer 1901 is consecutively coated with a 100 nm titanium adhesion layer 1902, a first 200 nm Ti/$MoS_2$ intermediate layer 1903, a second 900 nm $MoS_2$/Ti intermediate layer 1904, and a final 50 nm $MoS_2$ top layer 1905. Thus, the material composition can be deposited in the form of a multilayer structure, and the multilayer structure used as a medicament. Further, the multilayer structure can be formed in multiple layers over a substrate of interest, wherein each consecutive layer exhibits a decreasing atomic ratio of titanium to the transition metal M Ti:M, optionally starting with a bottom, or adhesion layer comprising 100% titanium. The consecutive layers may utilize variable proportions of titanium in the range of 99.99-0.01%, preferably 20-0.01%, when approaching the top layer of the multilayer structure.

Following the CFUBMS deposition process implants comprising $MoS_2$ layer can further be modified by exposure to a Trifluoroethoxyxanthate solution to yield a-trifluoroethoxy end-capped $MoS_2$ surface for fluoropassivation. This may provide additional benefits, such as decreased surface energy, and increased resistance to surface oxidation in humid environments. Such modified implants may serve similar purposes as described in Examples 23, 24, 25, 26, 28, and 36-43. The fluoropassivation can in particular be applied to the top layer of the previously described multilayer structure. Thus, aforementioned multilayer structure may include a bottom, or adhesion layer, and a top layer that is fluoropassivated.

Nitinol substrates produced according to the process of Example 7, and having a multilayer configuration as depicted in FIG. 19 were further evaluated with respect to their bioactivatable species release capability to substantiate the potential indication for further therapeutic use in-vivo. Samples were incubated in PBS Buffer solution under physiological pH and 37° C. for a period of 0-14 days. Respective supernatant samples were taken at 5 min, 1 day, 7 day and 14 day substrate exposure and subjected to quantitative ICP-MS analysis. Quantified species included a) Molybdenum ions as an indicator for bioactive agent concentration and b) Nickel ion concentration for determination of Nickel ion release retardation capability. At the study midpoint and end-point UV-VIS spectra were acquired to qualitatively substantiate the nature of the released species. Bioactive agent concentration released from coated NiTi samples averaged to 21717±324 µg/L on the first day of release, an intermediate level of 37467±752 µg/L on the study midpoint of seven days, and a final concentration of 40117±376 µg/L at the study endpoint of 14 days, which represents 83% of the predicted releasable maximum. Surprisingly, the multilayer coating was capable of releasing a much greater amount (554.69 µM) as compared to the limited $MoS_2$ aqueous solubility (0.125-1.25 µM). The release was visually detectable through a homogenous color change of the coating samples during the in-vitro release experiment, from a deep brown (0d), via green (7d), to red color (14d), indicating a homogeneous and controlled dissolution.

Figure 15:
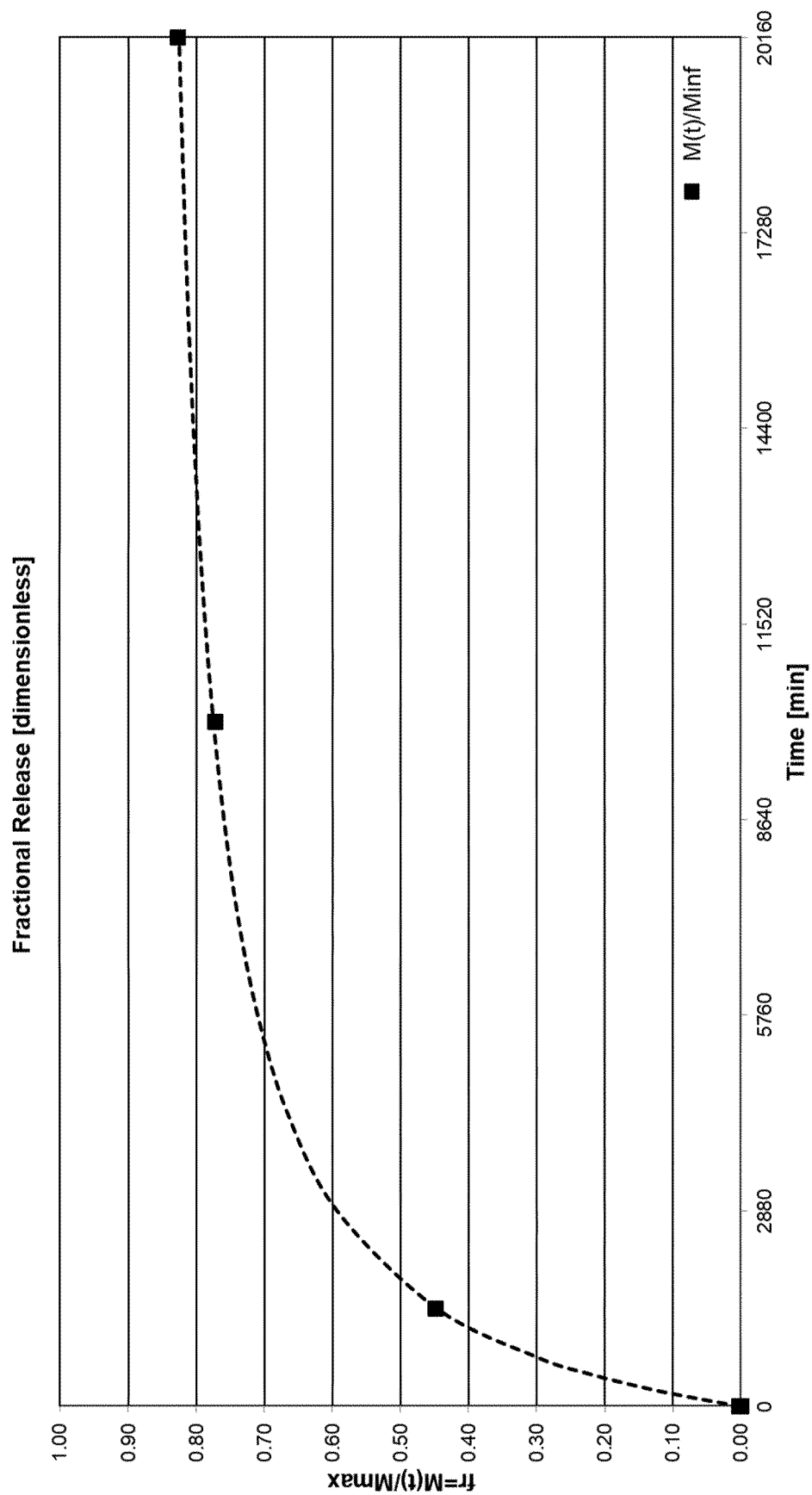
FIG. 15 is a graph that depicts the in-vitro dimensionless fractional release of $[MoO_4]^{2-}$ ions generated in situ from Nitinol samples coated with multiple $M_xA_yB_z$ transition metal chalcogenide coating layers of Formula I, each containing a variable atomic ratio of titanium formed over a substrate of interest, as one embodiment.

FIG. 15 is a graph that depicts the in-vitro dimensionless fractional release of $[MoO_4]^{2-}$ ions generated in situ from Nitinol samples coated with multiple $M_xA_yB_z$ transition metal chalcogenide coating layers of Formula I, each containing a variable atom % of titanium over a substrate of interest, produced according to the process of Example 7, and having a multilayer configuration as depicted in FIG. 19. The release follows follows Michaelis-Menten kinetics, with y=Vmax*x/(Km+x), wherein Vmax represents the maximum rate achieved by the system, that occurs at saturating substrate concentration for a given bioactivatable species concentration, and wherein the value of the Michaelis constant Km is numerically equal to the substrate concentration at which the reaction rate is half of Vmax, with Vmax being 0.883±0.002 and Km 1402.05±15.33. This clearly demonstrates that the achieved dissolution behavior is not diffusion-controlled, but instead governed by the rate of conversion of the bioactivatable species to the bioactivated species, occurring at the substrate interface. This type of transition metal chalcogenide coating therefore does not require the further embedding into a drug delivery matrix for achieving sustained release characteristics, as opposed to EXAMPLE 1. The advantages of using one or more transition metal chalcogenides based material compositions as medicament, that are provided in a non-bioactive form capable of in vivo conversion into a bioactive form under physiological conditions, as opposed to a using a highly water soluble and directly bioactive transition metal chalcogenide compound embedded in a drug delivery matrix, is thus readily apparent, e.g. from comparison of their relative duration of release.

Figure 16:
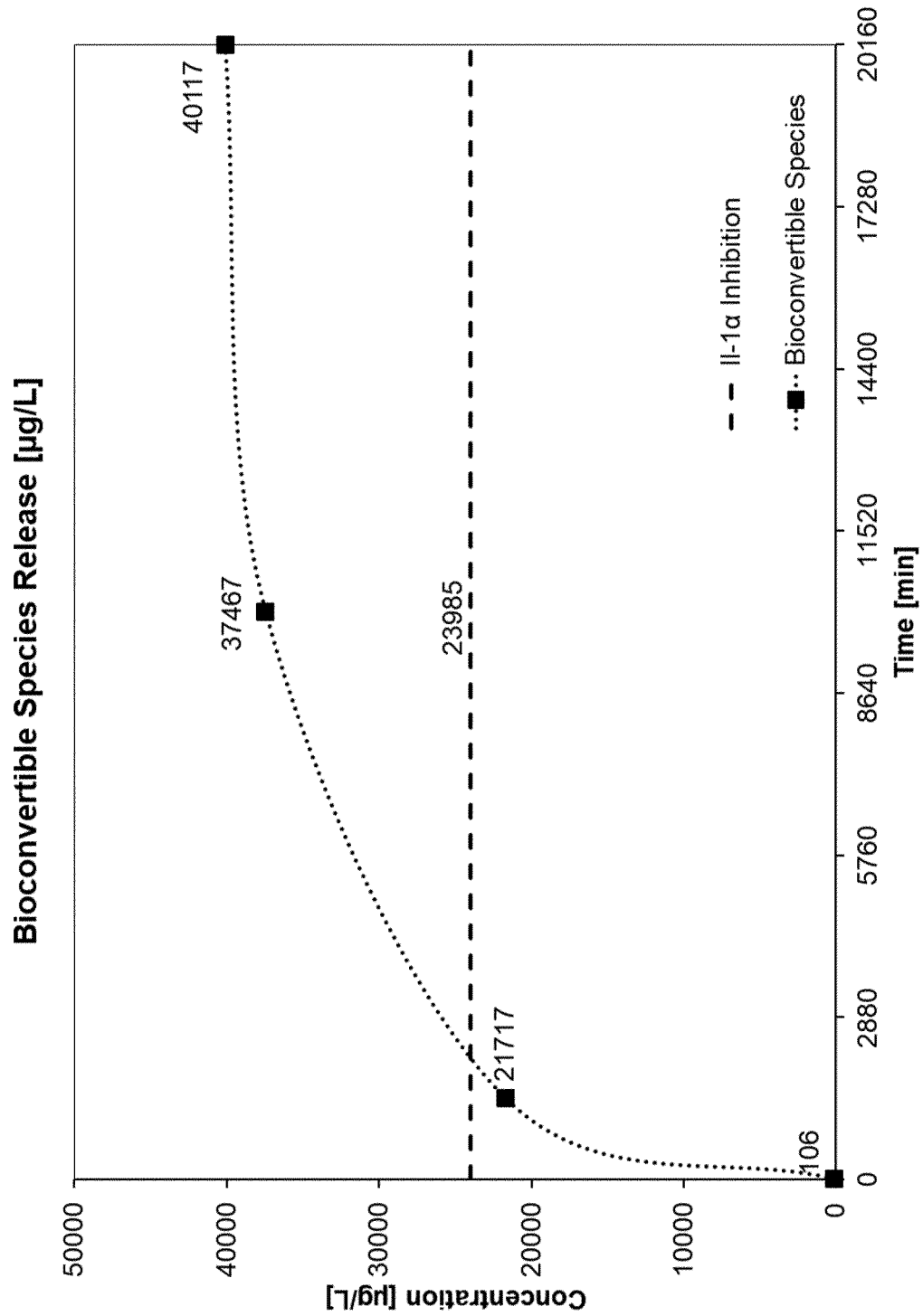
FIG. 16 is a graph that illustrates the in-vitro bioactivatable species release above an IL-1α Inhibition threshold, from Nitinol samples coated with multiple $M_xA_yB_z$ transition metal chalcogenide coating layers of Formula I, each containing a variable atomic ratio of titanium formed over a substrate of interest, as one embodiment.

FIG. 16 is a graph that illustrates the in-vitro bioactivatable species release above an IL-1α inhibition threshold, from Nitinol samples coated with multiple $M_xA_yB_z$ transition metal chalcogenide coating layers of Formula I, each containing a variable atom % of titanium over a substrate of interest, produced according to the process of Example 7, and having a multilayer configuration as depicted in FIG. 19. Because the IL-1α inhibition threshold is met shortly upon initiation of release, pharmacological activity is reasonably expected from these transition metal chalcogenide coatings.

Figure 17:
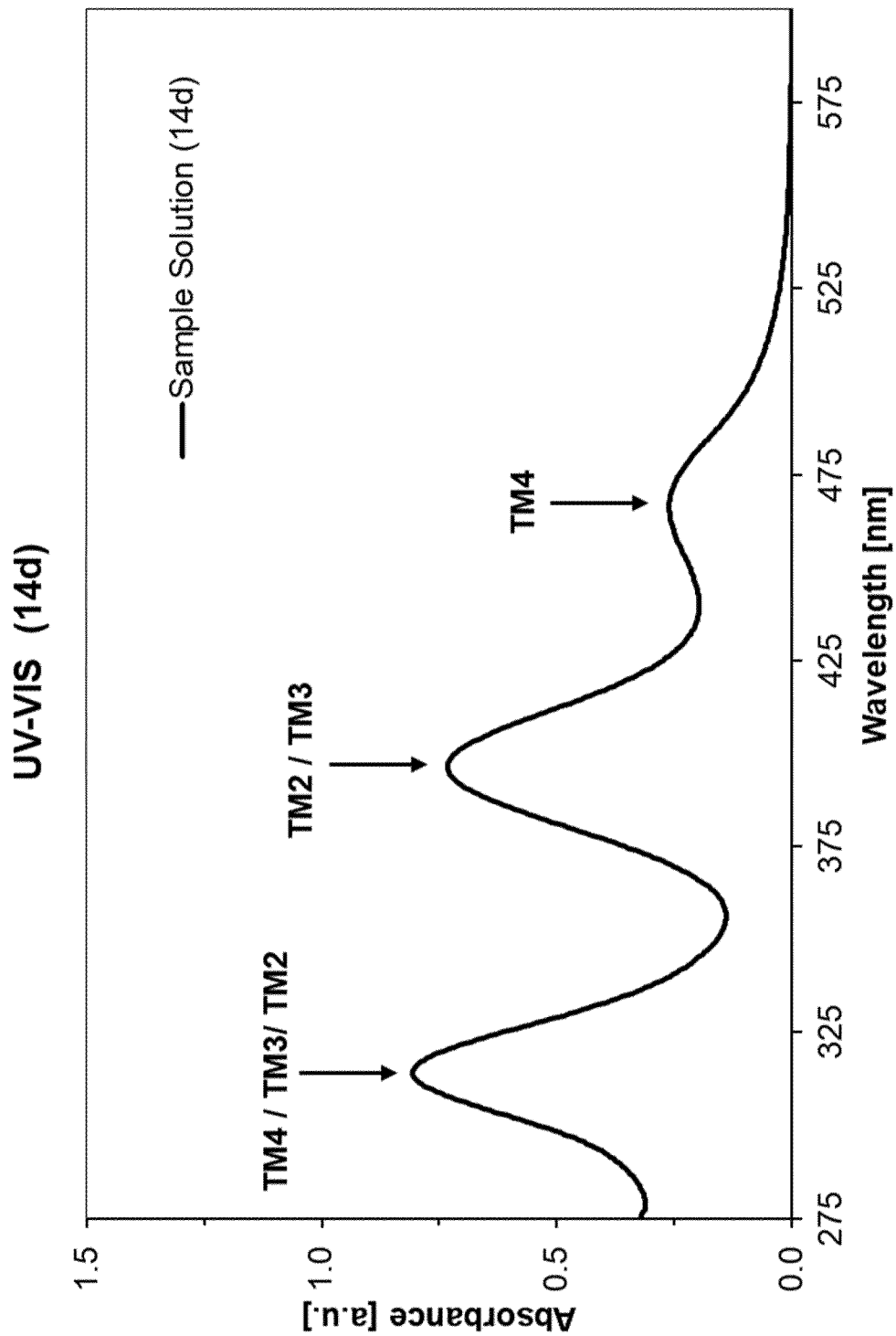
FIG. 17 is a graph that illustrates the forward conversion process of $[MoO_4]^{2-}$ to TM2/TM3/TM4 species in the presence of $S^{2-}$ Ions at a Mo:S ratio of 1:100, obtained on Nitinol samples coated with multiple $M_xA_yB_z$ transition metal chalcogenide coating layers of Formula I, each containing a variable atomic ratio of titanium formed over a substrate of interest, as one embodiment.

FIG. 17 is a graph that illustrates the forward conversion process of $[MoO_4]^{2-}$ to TM2/TM3/TM4 species in the presence of $S^{2-}$Ions at a Mo:S ratio of 1:100, obtained on Nitinol samples coated with multiple $M_xA_yB_z$ transition metal chalcogenide coating layers of Formula I, each containing a variable atom % of titanium over a substrate of interest, produced according to the process of Example 7, and having a multilayer configuration as depicted in FIG. 19. Because the bioactivatable species is converted in situ into its pharmacologically active, or bioactive, species in the presence of sulfide ions, pharmacological activity is reasonably expected from these transition metal chalcogenide coatings upon exposure to physiological conditions.

Example 8

Exemplary Transition Metal Chalcogenide Coating Configurations

EXAMPLE 8 provides variations of embodiments described in EXAMPLES 4, 5 and 6, in that the respective processes can be carried out in the presence or absence of gaseous precursors and equivalents to further modify the transition metal chalcogenide coatings. Similar to EXAMPLE 4, 5 or 6, a transition metal, for example Molybdenum, or a transition metal chalcogenide surface, for example a $MoS_2$ enriched/diffused surface or surface layer or surface volume, can be obtained by means of thermal evaporation, epitaxy process, magnetron sputtering, e-beam evaporation or ion bombardment of a transition metal/ transition metal chalcogenide target surface, for example $MoS_2$, in the presence or absence of gaseous precursors and equivalents.

EXAMPLE 8 provides variations of embodiments described in EXAMPLES 4-6, in that a first step can includes deposition of one or more transition metal (chalcogenide) layer(s), which can be subjected to a second or more steps involving one or more CVD processes, and reacting the transition metal (chalcogenide) layer(s) with a gaseous chalcogenide source(s), to enable the formation of stoichometric or non-stochiometric transition chalcogenide films of variable compositions and structures.

For these embodiments, the chemical compositions described for EXAMPLES 2 and 3 can be applicable, wherein the variable chemical compositions can be described through formulas $M_xA_y$ and/or $M_xB_z$ and/or $M_xA_yB_z$, wherein M is any transition metal, preferably molybdenum, and A and B represent two different chalcogenide elements, preferably Sulfur and Oxygen. A transition metal chalcogenide, such as molybdenum disulfide (in bulk, volume, layer or surface), can be obtained by reacting a suitable transition metal containing substrate and/or implant, for example on the basis of molybdenum, with gaseous precursors such as $H_2S$ to form the respective transition metal chalcogenide (e.g., $MoS_2$) as a coating or an incorporated component of a medical device, i.e., through a first sputter-coating of the metallic transition metal (e.g., Mo), followed by a consecutive exposure to $H_2S$, or by suitable other chalcogenide based reactants contained within the implant. The transition metal chalcogenide species may as well be interposed between the same, similar or different types of layers and materials. FIGS. 3, 4, 5, and 6 provide illustrations of alternative embodiments for multiple layer configurations that are contemplated.

Example 9

Hydrogel Loading with Transition Metal Species

For the incorporation of transition metal chalcogenide species into various hydrogels, many techniques known to persons skilled in the art can be applied based on the selected chemical loading procedure, which can be facilitated via ionic interaction. Such embodiments can be carried out with charged polymers, specifically anionic and cationic hydrogels, which are briefly described hereafter and detailed in EXAMPLES 10-13.

As one embodiment, a charged transition metal chalcogenide species comprising molybdenum and sulfur can be loaded into a preferably water-swellable polymer (hydrogel) through means of ionic interaction with oppositely charged core or base polymer formulation. The suitable polymer can form ionic and/or electrostatic and/or other types of attractive forces with suitable transition metal species, to enable the loading, holding, storing, complexing and/or covalently and/or non-covalently binding of the preferred transition metal chalcogenide species and to controllably release the desired species during a given application.

As another embodiment, an anionic and/or cationic hydrogel can act as a dynamic and/or static reservoir for a molybenum species through means of ionic interaction and/or crosslinking and equivalent processes. The technique is comparable to an ionic exchange resin loading process, for which the resulting loading capacity and equilibrium condition can be determined by means of titration and through determination of equilibrium constants pka and/or pkb. These loading and unloading processes can be reversible or substantially irreversible, and the unloading can be triggered through a stimulus response relationship, e.g. through a pH change (fast equilibration) and/or ionic strength change (slow equilibration) and/or ion exchange mechanism (slow equilibration). Such processes may be accompanied by a change of swelling degree and other properties, if a hydrogel matrix is used.

The preferably water-swellable cationic and/or anionic hydrogel can be present in physically and/or chemically crosslinked or non-crosslinked state or both, or undergo these crosslinking processes simultaneously or consecutively. In one variant of the disclosure, the crosslinker itself can provide a source for cationic and/or anionic groups or both, which can be capable of binding molybdenum containing anions and/or cations or both, rather than through the polymer itself.

In another variant, base or core polymer formulations can be transformed chemically to form the respective cationic or anionic hydrogels in situ. A prominent example includes polyvinyl alcohols, which can be available with different degrees of hydrolyzation. While these polymers are preferrably in the form of water-swellable hydrogels, other gel types, including xerogels, organogels, aerogels, lyogels and equivalents represent potential variations of the disclosure.

The base compositions may also include additional agents, fillers, additives and equivalents to adjust certain types of desired properties including radiopacity, MRI-visibility, visual contrast, density, swelling degree, elastic modulus, yield strength and equivalents. The preferred transition metals include molybdenum, niobium, tungsten or rhenium, and the preferred chalcogenides include sulfur, selenium, tellurium, antimony and/or arsenic.

Example 10

Transition Metal Chalcogenide Loaded Cationic Hydrogels

General Cationic Hydrogels Preparation and Molybdenum Loading Procedure: A readily available molybdenum containing oxo- or thio- or mixed oxothio-anion, including without limitation, tetrathiomolybdate anions $[MoS_4]^{2-}$, thiooxomolybdate anions $[MoO_2S_2]^2$, or molybdate anions $[MoO_4]^{2-}$, or their respective polyanions can be reacted with a preferentially water-swellable, cationic polymer. The aforementioned anions can be directly or indirectly provided through their respective water-soluble salts, including without limitation $(NH_4)_2MoS_4$, $(NH_4)_2MoO_4$, $Na_2MoO_4$, $MoO_3$, or $MoO_3 \cdot H_2O$ or $(NH_4)_6Mo_7O_{24} \cdot 4H_2O$ and equivalents. Alternatively, in case water solubility is limited, or an anhydrous environment is preferred, the respective molybdenum compounds can be provided in form of organic solvent based solutions (see EXAMPLE 1 for suitable organic solvents). FIG. 10 provides an illustration of a hypothetical microsphere embodiment as a medical device of interest.

The cationic polymers can be generally derived from polymers containing cationic moieties, including without limitation cationic side groups, a polymeric backbone containing cationic species, or a crosslinker containing cationic moieties. In particular, base polymers that contain primary, secondary, ternary or quaternary amino groups can be suitable for forming cationic polymers. In general terms, any functional group capable of being protonated may also serve the intended purpose when combined with a base polymer in one or more of the described forms as part of a side group, polymer backbone or crosslinker. Possible variations can include polymer blends, composites, block copolymers and equivalents, as conceivable by persons skilled in the art.

Exemplary polymeric compositions can include without limitation: DADMAC (polydiallyldimethylammonium chloride), PEI (polyethylenimine), DEAE (diethylaminoethyl-dextrane), N-acryloyloxyethyl-N,N,N-trimethyl ammoniumchloride, P(AAm-co-ADAM), polyacrylamides in general, including those formed from acrylamide, diethylaminoethylacrylamide, N-[tris (hydroxymethyl)methyl] acrylamide, N,N-methylene-bis-acrylamide, or other substances capable of forming cationic hydrogels. Other examples include cationic polymers directly or indirectly derived from natural sources, such as chitosan, gelatin and equivalents.

Exemplary cationic polymer preparation: To a solution containing 200 ml of deionized water, 58 g of sodium chloride and 27 g of sodium acetate can be added 400 ml of 1,2,3 trihydroxypropane. After adjusting the pH to a range between 5.9 and 6.1, approximately 90 g of N-tris-hydroxymethyl methylacrylamide, 35 mg of diethylaminoethylacrylamide and 10 g of N,N-methylene-bis-acrylamide can be added. The total volume of the mixture can be adjusted to 980 ml by the addition of hot water. In a consecutive step, 20 ml of a 70 mg/ml ammonium persulfate solution and 4 ml of N,N,N',N'-tetramethylethylene diamine can be added to initialize the polymerization reaction. Directly thereafter, the reactant solution can be poured into 4 liters of paraffin oil at 50-70 C under constant stirring conditions to afford the formation of an inverse suspension polymerization. The onset of the polymerization reaction of the acrylic monomers can be manifested by an increase in temperature. After completion of the polymerization reaction, the acrylic polymer can be obtained in the form of substantially spherical microspheres, which can be recovered by decanting and washing with copious amounts of deionized water to remove process residuals. Until subsequent use, the microspheres can be stored in a suitable buffer solution.

Exemplary molybdenum anion loading procedure: The prepared cationic hydrogel microspheres from EXAMPLE 4 can be contacted with an aqueous solution containing ammoniumtetrathiomolybdate $(NH_4)_2MoS_4$ until ionic exchange can be achieved. The ionic exchange/loading may be accompanied by a color change of the transparent microspheres to an orange-reddish color. The $[MoS_4]^{2-}$ loaded cationic hydrogel microspheres can be washed with deionized water to remove adhering reactant solution. For storing purposes, the loaded beads can be either lyophilized or stored in a suitable buffer solution until subsequent use.

Example 11

Transition Metal and/or TM Chalcogenide Loaded Anionic Hydrogels

General anionic hydrogel preparation and molybdenum loading procedure: An anionic hydrogel, including without limitation those formed from polyacrylates, polymethacrylates, polyvinyl acetates, hydrolyzed polyvinyl alcohols, polyvinylsulfates and polysulfonates, polyanhydrides and/or respective copolymers thereof, can be loaded directly with $Mo^{+4}$ or $Mo^{+6}$ cations from a suitable precursor, for example, $Mo(SO_4)_3$ in aqueous solution. FIG. 10 provides an illustration of a hypothetical microsphere embodiment as a medical device of interest.

Exemplary anionic polymer preparation: 100 ml surfactant solution containing 2.3 (w/w) % of polyvinyl alcohol (PVA) (MW 85-125 k g/mol, 87-89% hydrolysis degree) can be added to 900 ml of a 0.01 or 0.1 M phosphate buffer (PBS) solution. The solution can be poured into a three-necked round-bottomed 2000 ml flask equipped with a reflux condenser, a mechanical stirrer and a water bath. The aqueous phase can be heated to 65° C. under constant stirring at 100 rpm, while flushing the apparatus with nitrogen or argon. Then a monomer mixture containing 0.65 g of dilauroyl peroxide, 200.2 g methacrylic acid methyl ester and 2.86 g triethylene glycol dimethacrylate can be introduced into the aqueous phase and the stirring speed raised to 130 rpm. Inert gas flushing can be discontinued and the temperature can be maintained between 65-70° C. for a period of one hour. The consecutive onset of the polymerization reaction of the acrylic monomers can be manifested by an increase of temperature, after which the temperature can be maintained at 70-75° C. for one hour. After this time has elapsed, the polymerization reaction can be completed by raising the temperature to 85° C. for one hour. The suspension polymerisate can be obtained in form of spherical particles in a size range between 50-3000 µm, with the major particle fraction present at approximately in between 300-500 µm. The particle fractions can be subsequently size-separated into 50 µm size increments, and the desired size range can be subjected to alkaline hydrolysis. For example, 100 g of PMMA microspheres of size range 250-300 µm can be subjected to 8 hours of alkaline hydrolysis at 165° C. using a solution of 150 g of potassium hydroxide in 1400 g ethylene glycol. Upon cooling and decanting, the hydrolyzed PMA spheres can be washed with copious amounts of deionized water to remove process residuals.

In order to obtain the protonated hydrogel form with maximum cation loading capacity, the hydrolyzed microparticles can be acidified with hydrochloric acid down to a pH of 3.3, extensively washed with copious amounts of deionized water, and finally dried in a convection oven at approximately 70° C. Alternatively the microspherical agents may also be used in their salt form, e.g., in a slightly alkaline solution comprising an equal to or slightly above equilibrium concentration of NaOH or KOH with respect to the amount of cationic species present in the hydrogel.

Exemplary molybdenum cation loading procedure: The prepared anionic hydrogel microspheres from EXAMPLE 11 can be contacted with an aqueous solution containing molybdenum (VI) sulfate $Mo(SO_4)_3$ in a desired concentration range in between 0.01 M up to 2.0 M for a desired time frame of 1 h up to 24 h, until substantial ionic exchange can be achieved. The $Mo^{+6}$ loaded anionic hydrogel microspheres can be subsequently washed with deionized water to remove adhering reactant solution. For storing purposes, the loaded beads can be lyophilized, dried or stored in a suitable buffer solution until subsequent use. Based on diffusion kinetics, a lower $Mo(SO_4)_3$ concentration, for example 0.01-0.1 Mol can be suitable to distribute the molybdenum more evenly throughout the hydrogel beads, whereas a higher concentration than for example 0.1-2 Mol confers a shell enriched with the molybdenum species. Thus, concentration ranges of 0.01-2 Mol applied over a desired time frame can be used to steer the desired radial distribution of the molybdenum species inside the hydrogel microspheres. This technique can be reasonably anticipated to be compatible with any anionic hydrogels, particularly polycarboxylate polymers, such as polyacrylates and polymethacrylates, their respective derivatives and equivalents, sulfonic acid group containing polymers, such as polysulfones, carboxy-group containing Polyphosphazenes and equivalents. In analogy, the same goes for the reverse charge approach when loading a cationic hydrogel with an anionic molybdenum species.

Example 12

Transition Metal Chalcogenide Embedded Hydrogels by Diffusion and Subsequent Chemical Reaction As described in EXAMPLES 10 and 11, the transition metal species can be ionically crosslinked to the anionic or cationic hydrogel species. In this form, the exchange of the transition metal species with its aqueous environment can be accomplished through external triggers, such as ionic strength or pH change. In order to controllably limit the ionic interaction mechanism with its solution environment, the ionically bonded species may further be subjected to the described precipitiation mechanism, i.e, to obtain the transition metal chalcogenide in substantially insoluble form embedded inside the hydrogel matrix. An anionic polymer such as prepared in EXAMPLE 5 can be subsequently loaded with a cationic transition metal species, for example $Mo^{4+}$ or $Mo^{+6}$ cations from a suitable inorganic salt (e.g. chloride, sulfate and equivalents) in aqueous solution or organic solvent as described in EXAMPLE 1, and then reacted with gaseous $H_2S$ or dissolved sulfide ions $S^{2-}$ in solution to create either $MoS_2$ and/or $MoS_3$ and/or $[MoS_4]^{2-}$ or respective mixtures thereof, directly embedded in the polymer matrix. FIG. 10 provides an illustration of a hypothetical microsphere embodiment as a medical device of interest.

Since the resulting molybdenum compound can be obtained in substantially insoluble form in the respective aqueous environment or reaction solvent, it can predictably form a crystalline precipitate of tuneable size range within the polymer matrix. Also, the transition metal chalcogenide species can become finely distributed throughout the hydrogel matrix, affording a pigmentation effect, intense change of visual contrast, and thus enhanced optical visibility. The precipitate can also act as a filling agent and can be capable of adjusting the resulting polymer (hydrogel) density and its mechanoelastical properties. Furthermore, hydrogels can act as a substantially latent, potentially stimulus-responsive reservoir for controlled/targeted release of the desired transition metal chalcogenide species or accompanying pharmaceutical agents, consecutively, in parallel or independently.

Another beneficial effect can be obtained during CT and MRI diagnostic procedures, when a transition metal species is provided to an implant. For example, $MoS_2$ is a diamagnetic substance of high gravimetric density. It is capable of attenuating the strength of external magnetic fields as well as the intensity of incident X-Rays. When such a compound is part of an implant, for example a polymeric microspherical embolic agent composition, the implant can be endowed with additional MRI or CT contrast on the basis of the foregoing descriptions. If the implant type is a metallic vascular implant, a coating of $MoS_2$ may also provide a reduction in MRI observable artifacts, thus increasing digital contrast.

Example 13

Transition Metal Chalcogenide Embedded Hydrogels by Subsequent Heat-Treatment and Thermal Decomposition EXAMPLE 13 provides embodiments for incorporating transition metal chalcogenide species as part of a medical device, for use in the form of various hydrogels. A cationic polymer can be loaded with an anionic molybdenum species such as $[MoS_4]^{2-}$ as described in EXAMPLE 11 and subsequently heat-treated to achieve slow thermal decomposition in order to yield $MoS_3$ and/or $MoS_2$ in the presence or absence of oxygen, $MoO_2$ and/or $MoO_3$, and/or mixed oxides and sulfides, or both. FIG. 10 provides an illustration of a hypothetical microsphere embodiment as a medical device of interest.

Example 14

Pyrolysis of Transition Metal Chalcogenide loaded Hydrogels

EXAMPLE 14 provides embodiments for incorporating transition metal chalcogenide species as part of a medical device, for use to incorporate variable porosity into the implantable device. The process of EXAMPLE 13 can also be carried out to cause complete pyrolysis of the polymer substrate, thus rendering the molybdenum species in substantially spherical form. Depending on the calcinations degree, the temperature and time, the obtained particulate species may be of porous, semi-porous or non-porous nature. FIG. 10 provides an illustration of a hypothetical microsphere embodiment as a medical device of interest.

Example 15

Physical Loading of Implants with Transition Metal Chalcogenides

EXAMPLE 15 provides embodiments for incorporating transition metal chalcogenide species as part of a medical device, for use to incorporate variable porosity into the implantable device, for use to introduce variable porosity by physically precipitate, coat or diffuse into transition metal chalcogenide species. A nano-, meso or microporous implant substrate can be filled with the transition metal chalcogenide species, for example $MoS_2$, through one of the described chemical or physical means or both. For example, a surface- or bulk-porosified tantalum or titanium implant can be diffused with the suitable molybdenum compound in question, e.g., by means of precipitation, coating and/or diffusion, and optionally followed by additional chemical reaction or thermal decomposition reactions. This particular technique can reasonably be anticipated to store greater amounts of transition metal chalcogenides in the desired region of interest of an implant versus a non-porous implant surface or volume thereof. FIGS. 7-8 provide illustrations of embodiments for closed-cell and open porous structures, respectively, to introduce variable porosity of interest into medical devices.

Example 16

Monodisperse Transition Metal Chalcogenide for Structured Implant Surfaces

EXAMPLE 16 provides embodiments for incorporating transition metal chalcogenide species as part of a medical device, for use to combine monodisperse, spherical transition metal chalcogenides with implant surfaces or volumes thereof, to achieve a nano-, meso-, micro- or macrostructured implant surface with additional cellular response characteristics, enhanced flow dynamics, or wetting characteristics. The transition metal chalcogenide species, for example $MoS_2$, can be applied or used in form of monodispersed microspheres on the implant surface, within the implant volume, or as implant itself. This technique can also be carried out using colloidal solutions of the transition metal chalcogenide species, yielding nano-, meso, micro- or macro-structured implant surfaces with additional cellular response characteristics, enhanced flow dynamics (sharkskin effect), or wetting characteristics (Lotus-leaf effect).

Example 17

Particulate Transition Metal Chalcogenide Blends for Lubrication Enhancement and Drug Reservoirs EXAMPLE 17 provides embodiments for incorporating transition metal chalcogenide species as part of a medical device, for use to combine, respectively, blend, nano-, meso-, micro- or macroparticulate transition metal chalcogenide formulations of un-specified physical shape with one or more polymeric matrices forming one or more parts of the implant, to achieve enhanced tribological properties, or to act as a latent source or reservoir for the desired pharmaceutically active transition metal chalcogenide species. The transition metal chalcogenide species, for example $MoS_2$, can be applied as/or used in the form of solid, nano-, meso or microparticulate formulations embedded in a polymeric matrix. This can be facilitated via a regular extrusion process. Such a design can be used to enhance the lubricational/tribological properties of a contacting surface, such as for orthopedic implants, or for gliding surfaces, such as guide wire lumens for PTA catheters, or can act as a latent reservoir when applied to, or being part of a stent graft material. Potential variations include the use of metallic or ceramic matrices instead of polymeric matrices.

Example 18

Hollow Spherical Transition Metal Chalcogenides Loadable with Diagnostic or Therapeutic Agents EXAMPLE 18 provides embodiments for incorporating transition metal chalcogenide species as part of a medical device, for use to load hollow transition metal chalcogenide nano-, meso-, or microspheres with therapeutic or diagnostic agents. The transition metal chalcogenide species, for example $MoS_2$ can be applied or used in form of nano-, meso or microparticulate hollow spheres. A suitable process, such as solvothermal synthesis can be used to obtain the latter spheres. Through control of reaction conditions, these spheres may be loaded with other diagnostic or therapeutic agents.

Example 19

Fibrous Transition Metal Chalcogenides for Structured Implant Surfaces, Layers and Volumes, Polymer Blends, Matrices EXAMPLE 19 provides embodiments for incorporating transition metal chalcogenide species as part of a medical device, for use in analogy to EXAMPLES 16, 17 and 18. The transition metal chalcogenide species, for example $MoS_2$, can be provided in form of nanowires, nanotubes or nanolayers in analogy to examples 16, 17 or 18. FIG. 11 provides a hypothetical medical device comprising $M_xA_yB_z$ transition metal chalcogenide formed as a fibrous coating film over a substrate of interest, as one embodiment.

Example 20

Intercalated Transition Metal Chalcogenides for Enhanced Release and/or Degradation Control EXAMPLE 20 provides embodiments for incorporating transition metal chalcogenide species as part of a medical device, in the form of intercalating layers, wherein the transition metal chalcogenide species can be formulated to dissolve at an accelerated rate and release the deposited transition metal chalcogenide species within a desired environment. The transition metal chalcogenide species, for example $MoS_2$, can be applied to an implant surface or volume in form of intercalating layers, in amorphous, or crystalline state, inorganic, or organic form and/or combinations thereof. These intercalating layers can be formed via adding suitable elements, compounds or compositions known to persons skilled in the art. Such elements include without limitation, lithium and optionally other alkali and/or earth alkali elements, which can be used to cause a layer by layer defoliation mechanism of $MoS_2$, thereby accelerating degradation and releasing transition metal chalcogenides within a desired environment.

Example 21

Transition Metal Chalcogenides of Variable Porosity for Control of Cellular Interaction, In-Growth and Anchoring Capability EXAMPLE 21 provides embodiments for incorporating transition metal chalcogenide species as part of a medical device, by electrochemical processes to obtain one or more transition metal chalcogenide layer configurations of variable porosity. By controlling the porosity (pore size, number, lateral or volume distribution and depth) of the resulting layer, a desirable degree of cellular interaction can be achieved, for example, to control the degree of in-growth and the anchoring capability within surrounding tissue or bones. The transition metal chalcogenide species, for example $MoS_2$ can be first deposited via a process as outlined in EXAMPLES 4, 5 or 6 on a substrate of interest, then subjected to an electrochemical anodic dissolution process, to yield a nano-, meso-, micro- or macroporous implant substrate, for example, comprising $MoS_2$. FIGS. 7-8 provide illustrations of embodiments for closed-cell and open porous structures, respectively, to introduce variable porosity of interest into medical devices.

Example 22

Transition Metal Chalcogenides of Variable Porosity for Enhanced Drug Loading and Release Capabilities EXAMPLE 22 provides embodiments for incorporating transition metal chalcogenide species as part of a medical device, in the form of a porous transition metal chalcogenide matrix, wherein such matrix can store one or more therapeutic or diagnostic agents. The surfaces obtained, as described in EXAMPLE 21, can be filled with one or more pharmaceutic, therapeutic, or diagnostic agents, which can be diffused into the implant as a whole (bulk-), or in one or more sub-surface layers, or the top surface layer. Such layers are capable of physically storing additionally desired therapeutic or diagnostic agents within this porous transition metal chalcogenide matrix as compared to a plain coating. By controlling the degree of layer porosity, the amount of addable therapeutic or diagnostics agents as well as their subsequent release or performance characteristics, including time and dosage requirements, can be enhanced with respect to a given application, and a desirable degree of cellular interaction can be reasonably achieved, for example, to control in-growth and anchoring capability within the surrounding tissue or bones. FIGS. 7-8 provide illustrations of embodiments for closed-cell and open porous structures, respectively, to introduce variable porosity of interest into medical devices.

Example 23

Diffusion Barrier for Ions, including Nickel, Chromium and Cobalt

Figure 18:
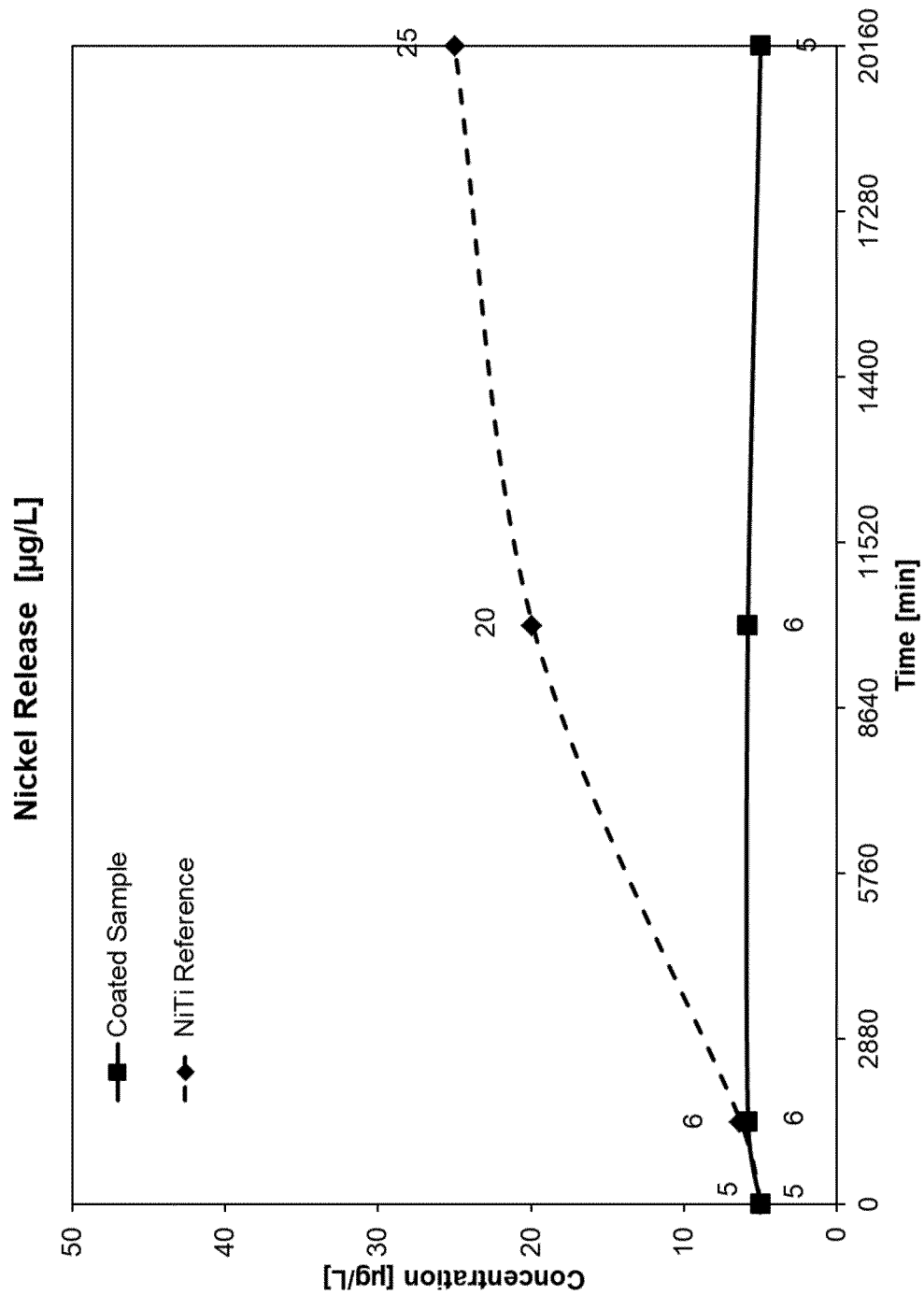
FIG. 18 is a graph that illustrates the $Ni^{2+}$ diffusion resistance of Nitinol samples coated with multiple $M_xA_yB_z$ transition metal chalcogenide coating layers of Formula I, each containing a variable atomic ratio of titanium formed over a substrate of interest, as one embodiment.

EXAMPLE 23 provides embodiments for incorporating transition metal chalcogenide species as part of a medical device, for use as a diffusion barrier layer to improve hemo- and biocompatibility, to reduce ion-leaching, to reduce allergenic potential, and to introduce other advantages. As described in EXAMPLES 4-9, a transition metal chalcogenide layer, for example a $Mo_xS_y$ layer can be deposited on an implant surface. Such a layer, when deposited in suitable dimensions (preferably with a thickness exceeding 300 nm, and more preferably exceeding 1 µm, and most preferably 2 µm) can act as a diffusion barrier for implant materials prone to undesirable ion leaching when exposed to aqueous environments. Such a diffusion barrier coating can provide substantial advantages when such a transition metal chalcogenide layer is applied to nickel, chromium or cobalt containing implants, or implants comprising out of Nickel-Titanium (NiTi) based alloys. Other implants can include without limitation NiTi or MP35, or CoCr (L605, Phynox) based vascular implants, such as stents, or can also include subdermal and dermal implants, such as Ni-containing piercings. The additional diffusion barrier can reduce the leaching of nickel ions, which can in turn, improve hemo- and biocompatibility, reduce inflammatory response/immune response against the implant. Also by acting as a diffusion barrier, the transition metal chalcogenide layer can physically eliminate contact between blood/tissue and allergenic metal components for improved haemo- and biocompatibility of any medical devices that may contain constituents with allergenic potential. Additional variations of this concept include the use of adhesion promoters or tie layers, which can be used to facilitate increased chemical and/or physical compatibility between layers of different chemical composition or physical morphology or both. One such tie layer, for example, can be composed of a 10-100 nm titanium or chromium containing layer. FIG. 18 is a graph that illustrates the $Ni^{2+}$ diffusion resistance of Nitinol samples coated with multiple $M_xA_yB_z$ transition metal chalcogenide coating layers of Formula I, each containing a variable atom % of titanium over a substrate of interest. Samples were manufactured according to Example 7, using a multilayer configuration as shown in FIG. 19.

Example 24

Anti-Corrosion Layer for Extended Fatigue Life and Corrosion Performance

EXAMPLE 24 provides embodiments for incorporating transition metal chalcogenide species as part of a medical device, for use as an anti-corrosion layer to extend fatigue life and corrosion performance. As described in EXAMPLES 4-9, a transition metal chalcogenide layer, for example, a $MoS_x$ layer can be deposited on an implant surface. Such a layer, when deposited in suitable dimensions (preferably having a thickness exceeding 300 nm, and more preferably exceeding 1 µm, and most preferably 2 µm) can act as an anti-corrosion layer for implant materials that can be expected to be exposed to conditions that support corrosion. As an embodiment, a transition metal chalcogenide layer can be applied to nickel, chromium or cobalt containing implants, or more specifically, implants comprising out of SS316L, NiTi, $MP_{35}$, or CoCr (L605, Phynox), and vascular implants, such as stents. The additional anti-corrosion layer can reduce the exposure to corrosive forces, when the implant is in contact with physiological fluids. Vascular implants, particularly stents, can be exposed to various forms of corrosion, e.g., such as fretting or pitting corrosion. If device usage is expected in a highly dynamic environment, the effect of corrosion can lead to reduced fatigue performance, higher probability of implant fracture, and thus, higher expectation for re-intervention. As another embodiment, medical devices comprising a transition metal chalcogenide layer further incorporates adhesion promoters, or tie layers, which can be used to facilitate increased chemical and physical compatibility between layers of different chemical composition. One such tie layer, for example, can be composed of a 10-100 nm titanium or chromium containing layer. Another variation may include the use of surface functionalization agents for the transition metal chalcogenide layer to further enhance anti-corrosive or other surface-guided properties of the implant coating. The inhibition of corrosion, as indicated through prevention of metal ion release from the sample, is further indicated by FIG. 18.

Example 25

Corrosion Controlling Layer

EXAMPLE 25 provides embodiments for incorporating transition metal chalcogenide species as part of a medical device, for use as a corrosion controlling layer to control the resorption rate of metal-alloy based bioresorbable implants under physiological conditions (as described in EXAMPLES 4-9). As an embodiment, medical devices comprising transition metal chalcogenide species can be utilized as a corrosion controlling layer for physiological environments, for example, to decrease the corrosion rate for Magnesium alloy based, other metal alloy based implants, including bioresorbable vascular scaffolds, graphs, and stents. Other alloy compositions, such as those described in EXAMPLE 41, are fully contemplated. The inhibition of corrosion, as indicated through prevention of metal ion release from the sample, is further indicated by FIG. 18.

Example 26

Degradation Controlling Layer

EXAMPLE 26 provides embodiments for incorporating transition metal chalcogenide species as part of a medical device, for use as a degradation-controlling layer to control the degradation rate of polymeric-based bioresorbable implants under physiological conditions (as described in EXAMPLES 1-9). The inhibition of degradation, as indicated through prevention of metal ion release from the sample, is further indicated by FIG. 18.

Example 27

Diamagnetic Shielding Effect for Reduction of MRI Artefacts

EXAMPLE 27 provides embodiments for incorporating transition metal chalcogenide species as part of a medical device, for use as a diamagnetic shielding on implants to reduce MRI artefacts. For example, $MoS_2$ exhibiting intrinsic diamagnetic properties, can be incorporated into various implants to attenuate an externally present magnetic field. A coating film comprising $MoS_2$ can effectively reduce the formation of MRI artefacts during diagnostic applications by providing diamagnetic shielding.

Example 28

Lubrication Layer/Friction-Reduction Layer

EXAMPLE 28 provides embodiments for incorporating transition metal chalcogenide species as part of a medical device, for use as a lubrication layer (as described in EXAMPLES 4-9) on implants to reduce friction and introduce other advantages. When deposited as a coating film on the surface of medical devices, such as scaffolds or stents, the $MoS_2$ promotes a lubrication effect on contacting surfaces, thus minimizing the amount of friction generated during device usage. For example, during the process of implant deployment within patient tissues, the $MoS_2$ can improve the maneuvering and/or steerability of the device to ease deployment, reduce the degree of force necessary to move the device to the desired location, reduce the tissue-damaging impact along vascular tissues during deployment, and reduce the possibility of further damaging pre-existing lesions. The same rationale can be applicable on other surfaces subject to wear and/or abrasion.

Example 29

Ablative Layer

EXAMPLE 29 provides embodiments for incorporating transition metal chalcogenide species as part of a medical device, as described in EXAMPLES 4-9 for use an ablative layer(s) on implants. A functional layer can be capable of renewing its surface properties upon mechanical wear or chemical corrosion, based on the intrinsic layer structure of $MoS_2$. Thus, it cannot only be capable of providing a renewable supply of Mo cations into its adjacent and immediate surroundings, but can also facilitate the constant and controllable rate of metabolization, and continuous formation of copper-chelating agents in vivo. EXAMPLES 4-9 describing methods to deposit a transition metal chalcogenide layer are applicable herein.

Example 30

Sustained-Release Matrix

EXAMPLE 30 provides embodiments for incorporating transition metal chalcogenide species as part of a medical device, for use as a sustained-release matrix (as described in EXAMPLE 22) for pharmaceutical agents, to enable enhanced therapeutic and/or diagnostic performance. The transition metal chalcogenide loaded microspherical hydrogels of EXAMPLES 10-13 can be additionally loaded with pharmaceutical agents to serve as a sustained drug release matrix, or may contain other beneficial compounds which can provide additional therapeutic, diagnostic or other performance-enhancing functionalities. FIG. 10 provides a hypothetical embolic particle configuration as an exemplary embodiment.

Example 31

Embolic Particles

EXAMPLE 31 provides embodiments for incorporating transition metal chalcogenide species as part of a medical device, for use as an embolic agent when formulated in the form of microspheres, as described in EXAMPLE 21. As another embodiment, the transition metal chalcogenide loaded hydrogels described in EXAMPLES 10-13, when used in the form of microspheres, can be used as an embolic agent, to provide for a minimally invasive tumor treatment, e.g., for the treatment of uterine fibroids, hepatocellular carcinoma, prostate cancer, hyper-obstructive cardiomyopathie, and equivalents. FIG. 10 provides a hypothetical embolic particle configuration as an exemplary embodiment.

Example 32

Radioactive Tracer, Diagnostic Marker and Therapeutic Agent

EXAMPLE 32 provides embodiments for incorporating transition metal chalcogenide species as part of a medical device, for use as a diagnostic marker, therapeutic agent, and/or radioactive tracer. As an embodiment, medical devices comprising radioactive isotopes of molybdenum are contemplated, wherein $^{100}$Mo for example. $^{100}$Mo can be naturally present in molybdenum by up to 9.63% or synthetically produced $^{99}$Mo, the latter having a half-life of 65h and decays to the isotope $^{99}$Tc, an agent utilized frequently in nuclear medicine. As another embodiment, medical devices comprising radioactive isotopes of molybdenum are contemplated for use as a diagnostic tracer for enhanced visibility. As another embodiment, medical devices comprising radioactive isotopes of molybdenum are contemplated for use in radioactive treatment therapy (treatment for neointima growth/cancer). For example, medical devices comprising $^{100}$Mo are contemplated analogous to commercially use of SIR-Spheres (glass-based) which can be loaded with Yttrium 90Y.

Example 33

In Vivo Molded Scaffold

EXAMPLE 32 provides embodiments for incorporating transition metal chalcogenide species as part of a medical device, for use as a liquid cast, in vivo moldable scaffold (as described in EXAMPLES 1-3 and 10-13). Microspheres can be incorporated as part of a liquid cast, in vivo moldable scaffold formulation in order to adjust the radiopaqueness and density of the implantable device, and to introduce additional functionality including anti-inflammatory and/or anti-proliferative effects.

Example 34

Phase-Adaptive Implant

EXAMPLE 33 provides embodiments for incorporating transition metal chalcogenide species as part of a medical device, for use to enable surface modification processes to produce phase adaptive implants. As illustrated in FIG. 1, phase adaptive concepts can be applied in designing medical devices that have improved therapeutic properties. For example, the coating for medical devices comprising molybdenum compound can be surface modified by altering the geometry of the film layer and/or respective particle geometry to achieve a timed drug-release behavior depending on the different phases of implant integration. In the first weeks and months following device implantation, the anti-inflammatory and anti-proliferative properties of the molybdenum compounds can be effective to advance optimal healing. However, it is conceivable to further incorporate an anti-thrombogenic agent through additional surface modification of the molybdenum species (covalently or non-covalently, and/or through ionic interaction or other surface binding reactions) so that the anti-thrombogenic agents can exert the pharmacological effects in the acute implantation phase, as illustrated in FIG. 3, in which a coating film comprising $M_xA_yB_z$ can be further modified by fluoropassivation, as one embodiment. In the subacute and long-term implantation phases, the molybdenum species can exert anti-inflammatory and anti-proliferative activities when physiologically converted from the non-bioactive state to a bioactive state.

Example 35

Replenishable Drug Depot

EXAMPLE 34 provides embodiments for incorporating transition metal chalcogenide species as part of a medical device, for use as a replenishable drug depot. As described in EXAMPLE 32, a porous molybdenum scaffold can be reloaded with a pharmaceutical agent of interest by utilizing an agent with a high surface binding affinity towards molybdenum (e.g., through a suitable surfactant, such as described in EXAMPLE 4, or by means of surface charge, electrostatic or ionic interaction, covalent binding) or by surface-tension effects, and/or by a suitable polymeric carrier matrix, such as an anionic or cationic hydrogel disposed in between the porous molybdenum matrix.

Example 36

Bioactivatable Orthopedic Implants

EXAMPLE 36 provides several embodiments for incorporating transition metal chalcogenides of Formula I into bioactivatable orthopedic implants. Orthopedic implants can be mechanically anchored or physically integrated into bone and surrounding tissues. Examples of suitable orthopedic implants include bone anchors, screws, nails, plates, and articulating joint prosthetics, such as vertebrae-, knee-, shoulder-, and hip prosthesis components and equivalents.

Bone implants can fail during post-implantation stages for a number of reasons, including periprosthetic bone loss, pseudomembrane formation, and osteolysis. These changes can be generally referred to as aseptic implant loosening. Aseptic loosening can result from inadequate initial fixation, mechanical loss of fixation over time, and/or biologic loss of fixation caused by particle-induced osteolysis around implants. Particle accumulation may result from general wear stresses (shear and compression forces) at the interface between implant and surrounding tissue, various micromotions occurring in response to in vivo corrosion, oxidative reactions, and minor pathogen contaminations. In general, the initial response by the body to an implant is manifested as a localized anti-inflammatory response characterized by the formation of fibrous tissue encapsulating the implants. The pathogenesis of implant-induced osteolysis is believed to involve complex inflammatory and osteolytic processes. The sustained chronic inflammatory response, initiated by the formation of particulate debris at the implant-bone interface, can lead to cellular recruitment involving macrophages, fibroblasts, giant cells, neutrophils, lymphocytes, and most importantly, osteoclasts, the principal bone-resorbing cells. On a more acute scale, generally, the success or failure of osseous and soft-tissue integration, respectively, can correlate with the absence or presence of bacterial infection following implantation.

Substantial performance improvements can be reasonably expected by incorporating material formulations comprising transition metal chalcogenides of Formula I into various bioactivatable orthopedic implants. For example, bioactivatable osseous implants comprising transition metal chalcogenides of Formula I can be effective in reducing the various inflammatory and proliferative activities triggered by the implantation procedure. The management of implant-induced inflammatory responses can substantially improve implant biocompatibility, acknowledged as a persistent challenge inherent to most invasive implants.

By incorporating a variable proportion of two or more transition metal chalcogenide species, with at least one having anti-inflammatory, another one having anti-bacterial properties, a balancing range of desirable anti-inflammatory and anti-bacterial therapeutic properties can be obtained. Mixed transition oxometallate species can be specifically formulated, for example by direct provision of a transition oxometallate species, such as a molybdate in combination with a transition thiometallate, such as tetrathiomolybdate, or naturally obtained through the oxidative susceptibility of the initially provided transition metal chalcogenide species, such as $MoS_2$, by environmental exposure under ambient conditions. Alternatively, specific oxothiometallate species can be selected and provided based on predictable metabolization kinetics and chemic equilibria, to effect a continuously changing or nearly constant therapeutic spectrum over time. An exemplary coating configuration having a substantially bacteriostatic outer layer comprising $MoO_3$ and a dormant, bioactivatable layer comprising $MoS_3$, to effect a variable therapeutic spectrum over time is provided in FIG. 4, whereas the configuration can be created according to the methodology described in EXAMPLE 2. When modified accordingly, an implant surface intended for osseous tissue contact can be rendered to exhibit anti-bacterial and anti-inflammatory properties at substantially the same, similar or different time phases following implantation and exposure to physiological environment. Enhanced bacteriostatic properties can substantially reduce the risk, the onset, the spread, and the severity of bacterial infection. Such properties can be specifically inducible in this manner for preventing or reducing the risk of developing a bacterial infection following implantation.

In additional embodiments, the implants interfacial morphology, particularly the anchoring portion of the device, can further be provided selectively porosified as described in EXAMPLE 21 or EXAMPLE 22 and illustrated in FIG. 7 or FIG. 8, to effect variable degrees of cellular interaction, tissue in-growth and implant anchoring at desired implant regions of interest, to facilitate improved osseointegration. The potential physical pathways for pathogen infiltration can be reduced and the long-term implant stability can be improved. In functional comparison, incorporation of non-porous and substantially smooth $MoS_2$ transition metal chalcogenide layers, as part of the articulating surface of orthopedic implants, in analogy to the described EXAMPLE 28, can beneficially improve lubrication, wear and abrasion characteristics.

Furthermore, by incorporating a fluoropassivation top layer over a transition metal coating as described herein, the blood compatibility of an implanted device can be selectively enhanced during the first phase immediately following implant integration, by selectively facilitating albumin absorption. This can foreseeably enhance the formation and proliferation of an initial cell layer, potentially improving the degree of soft-tissue integration. The resulting enhancement in osseous ingrowth can reduce platelet adherence, platelet activation, and/or thrombus formation.

The transition metal chalcogenide species can be provided in the form of a coating or a filling agent, and deposited by the various available processes as described in the previous examples. Alternatively, formulations can be ionically attached to a hydrogel film formed over the tissue-contacting interfacial regions of implants. When embodied as a filling agent, the dispersion can be further improved by the surface modification of the particulate matter.

Example 37

Bioactivatable Indwelling Catheter Devices for Long-Term Use

EXAMPLE 37 provides embodiments for incorporating transition metal chalcogenides of Formula I into bioactivatable indwelling catheter devices intended for long-term use. Exemplary bioactivatable indwelling catheter devices include any blood-contacting devices such as venous access devices, PICC lines, central venous catheters, arteriovenous shunts, and hemodialysis catheters. Bioactivatable indwelling catheter devices that do not come into contact with blood are contemplated, including Foley catheters, which are flexible tubes that can be passed through the urethra and sustained in the bladder for prolonged periods. A majority of blood-contacting, indwelling medical products intended for prolonged usage cause major biomedical problems, including: (a) risks for developing bacterial infection and subsequent biofilm formation; (b) acute, subacute or chronic risks for thrombus formation caused by the activation of blood coagulation cascade; (c) catheter obstructions caused by the formation of mineral, calcified, or fatty deposits; (d) fibrin-sheet formation; (e) undesirable tissue in-growth into long-term indwelling devices; (f) complicated removal after implant rejection caused by complement cascade activation leading to macrophage attack, inflammation, encapsulation by collagenous tissue; (g) material incompatibility; and (h) accelerated biodegradation caused by extensive sterilization processes required for long-term indwelling devices. Furthermore, various technical problems inherent to long-term indwelling devices may arise, such as decrease in flow rate/increase in flow resistance, interference with recirculation, increase in leakage (air/liquid), and suboptimal mechanoelastical performance, such as elongation at yield. These complications can lead to insufficient device performance, premature device failure, decreased device life span, which can have a deleterious effect on patient health and therapeutic progress.

Bioactivatable indwelling devices for prolonged usage can be conferred with prohealing properties by incorporating the disclosed formulations comprising transition metal chalcogenides of Formula I. For example, the incorporation of a fluoropassivation promoting as a top (exterior) coating can improve blood compatibility in the first phase of implant integration, by increasing the selective absorption of albumin, thereby facilitating the reduction of one or more of the following: platelet adherence, platelet activation, thrombus formation, hemolytic properties, and/or reduction of blood coagulation. By incorporating the transition metal chalcogenide species of Formula I, for example, Molybdenum disulfide, the molybdenum species can exert anti-inflammatory and anti-proliferative activities when physiologically converted from the non-bioactive state to a bioactive state. Furthermore, additional bacteriostatic properties can be conferred by incorporating a mixed transition oxometallate species, for example, by enabling the slow oxidation of a transition metal chalcogenide such as $MoS_2$ under ambient conditions, or by directly providing a transition oxometallate species, such as a molybdate. Enhanced bacteriostatic properties can substantially reduce the risk, the onset, the spread, and the severity of bacterial infection. Such properties can be specifically desirable for long-term indwelling devices potentially exposed to bacteria and prone to infection, such as Foley catheters useful in urological treatments. The transition metal chalcogenide species can be provided in the form of a coating or a filling agent, deposited by the various processes described in previous examples. When embodied as a filling agent, the dispersion may be further improved by surface modifications of the particulate matter.

Example 38

Bioactivatable Heart Valves and Leaflets

EXAMPLE 38 provides embodiments for incorporating transition metal chalcogenides of Formula I into bioactivatable prosthetic heart valves and leaflets. Diseased or dysfunctional heart valves due to various pathological reasons (congenital or acquired valve diseases) may affect valve shape, flexibility and functionality. Fortunately, some functionally impaired heart valves can be surgically replaced by prosthetic heart valves with favorable prognosis.

Prosthetic valves are predominantly categorized into mechanical and bioprosthetic types. Mechanical heart valves can be constructed exclusively from synthetic biomaterials having properties of substantial durability and endurance. However, limited biocompatibility of such devices requires a lifetime of anti-coagulant prescriptions to actively prevent/reduce the inherent thrombosis risks and subsequently inducible embolic events. Unlike mechanical heart valves, bioprosthetic heart valves are substantially composed of materials derived from biological matter. They can be classified into "graft-type," which are substantially grafted from another individual; and "tissue-type," which are constructed in whole or in part with natural-tissue parts, such as valve leaflets. Although bioprosthetic heart valves generally can be less durable than mechanical valves, bioprosthetic heart valves may be preferable: for exhibiting improved hemodynamics, for simulating the natural design and material properties of real tissue, for reducing the risks for thrombosis and embolism, and for obviating long-term anticoagulant treatment. However, biologically derived heart valves may be susceptible to accelerated degeneration and/or calcification as a result of glutaraldehyde fixation, mechanical stresses, and the deposition of calcium phosphate on surfaces. Faster degeneration of biological heart valves requires additional surgery to replace or repair the valves after 10 to 15 years. Therefore, an unmet need continues to exist for improving materials of biological or synthetic origin for forming prosthetic heart valves or leaflets that can exhibit non-thrombogenic and anti-inflammatory properties, providing adequate biocompatibility and/or hemocompatibility, and protecting against factors that can increase the degeneration and/or calcification rates.

Bioactivatable heart valves and leaflets can be conferred with prohealing properties by incorporating the disclosed formulations comprising transition metal chalcogenides of Formula I. When transition metal chalcogenide species can be physiologically converted upon exposure to body liquids and tissue, from a non-bioactive state to a bioactive state, these bioactive components can exert anti-inflammatory and anti-proliferative activities capable of reducing excessive cellular proliferation and/or calcification. In addition, by incorporating a fluoropassivation top layer over a transition metal coating as described herein, the blood compatibility of an implanted device can be selectively enhanced during the first phase immediately following implant integration, by selectively facilitating albumin absorption.

Furthermore, additional bacteriostatic properties can be conferred by incorporating a mixed transition oxometallate species, for example, by enabling the slow oxidation of a transition metal chalcogenide such as $MoS_2$ under ambient conditions, or by directly providing a transition oxometallate species, such as a molybdate. Enhanced bacteriostatic properties can substantially reduce the risk, the onset, the spread, and the severity of bacterial infection following implantation.

The transition metal chalcogenide species can be provided in the form of a coating or a filling agent, and deposited by the various processes described in previous examples. Alternatively formulations can be provided ionically attached to a hydrogel film formed over the tissue contacting interfacial regions of the implant. When embodied as a filling agent, dispersion may further be improved by surface modification of the particulate matter. When embodied as a device coating, further surface modification, for example fluoropassivation may be provided to decrease the adherence of blood to the device and to improve hemodynamic conditions. The topmost surface of the implant can be further modified with specific surface structures that can confer additional advantageous properties as briefly explained in EXAMPLE 16.

Example 39

Bioactivatable Tracheal Tube Implants

EXAMPLE 39 provides embodiments for incorporating transition metal chalcogenides of Formula I into bioactivatable medical tubings in substantial contact with air, including tracheal tubings. Tracheal tubes are catheter-like medical devices that can be inserted into the trachea (endotracheal) for the primary purpose of establishing and maintaining a patent airway and for supporting adequate exchange of oxygen and carbon dioxide. Tracheal tubes are manufactured in various types, materials and sizes, adapted for oral or nasal placement, cuffed or uncuffed, and as single or multi-lumen configurations. The preformed or reinforced tubing materials can be manufactured from Silicone, Polyvinyl chloride, latex, polyurethane and other equivalent medical grade tubing materials. These devices can be deployed ranging from a few hours up to one or more weeks. As a consequence of extended placement, mucus or sputum can build up on the internal cuff membrane intended for sealing the airway. This can cause a variety of complications including deleterious biofilm formation, bacterial infection, and risk for developing ventilator-associated pneumonia.

Bioactivatable medical tubing (e.g., tracheal tubes) can be conferred with prohealing properties by incorporating the disclosed formulations comprising transition metal chalcogenides of Formula I. Furthermore, additional bacteriostatic properties can be conferred by incorporating a mixed transition oxometallate species, for example, by enabling the slow oxidation of a transition metal chalcogenide such as $MoS_2$ under ambient conditions, or by directly providing a transition oxometallate species, such as a molybdate. Enhanced bacteriostatic properties can substantially reduce the risk, the onset, the spread, and the severity of bacterial infection following implantation.

The transition metal chalcogenide species can be provided in the form of a coating or a filling agent, and deposited by the various processes described in previous examples. Alternatively formulations can be provided ionically attached to a hydrogel film formed over the tissue contacting interfacial regions of the implant. When embodied as a filling agent, dispersion may further be improved by surface modification of the particulate matter. As a device coating, further surface modification can be performed, for example, through fluoropassivation to decrease adherence of mucus/sputum to the device.

Example 40

Bioactivatable Hernia Patches

EXAMPLE 40 provides embodiments for incorporating transition metal chalcogenides of Formula I into bioactivatable hernia patches. Hernia patches can be utilized for treating a variety of hernias, such as abdominal, groin, umbilical and other types of hernias. An abdominal hernia can develop from a disruption of the fascia or fibrous tissue in the abdominal wall, potentially leading to a visible bulge, bowel obstruction and tissue strangulation, among other complications. Mesh-like materials or "patches" predominantly formed from synthetic materials such as Polypropylene, Polyester and ePTFE can be placed on the defective area and sutured into place to reinforce the affected tissue walls. These mesh-like materials can be used in combination with similarly constructed materials or with a range of other materials such as titanium, omega 3, monocryl, PVDF and hyaluronate. However, the usage of such hernia patches have been frequently associated with serious adverse events including fibrosis, encapsulation and scar tissue formation, due to unmanaged inflammatory responses from moderate to poor biocompatibility properties inherent to implanted materials. Unfortunately, such fibrotic tissue reactions can lead to significant levels of pain and motion restrictions. It appears that these synthetic materials commonly utilized by the medical device industry are not completely acceptable by the human body without deleterious complications. It is conceivable that incorporating the disclosed material formulations comprising the transition metal chalcogenides of Formula I can provide prolonged anti-inflammatory protection that can be evoked and sustained for the intended implantation duration, thereby substantially improving the performance of hernia implants. In one embodiment, a hernia patch may be formed from a PVDF homo- or copolymer formulation, or any number of polymer types, by adding the transition metal chalcogenide in finely dispersed or dissolved form to the respective polymer at a given weight percentage. The polymer can then be further compounded or blended, homogenized, and extruded by various means to form, for example, a woven or nonwoven mesh type of implant comprising the transition metal chalcogenides in a finely dispersed form. Alternatively, preformed mesh-type implants can be modified by performing a coating operation such as described in previous examples.

Example 41

Bioactivatable Transition Metal Derived Medical Implant

EXAMPLE 41 provides a variation of the previously contemplated medical device embodiments, in which the implant can be directly manufactured from a transition metal, or transition metal alloy, instead of the previously disclosed embodiments in which the desired transition metal chalcogenide species can be formed in vivo from a slowly bioabsorbable implant. This embodiment obviates the need to provide the transition metal chalcogenide species by way of coating onto an implant surface or deposition within a matrix and instead can utilize a pure or alloyed form of a transition metal as an implant forming material that can be controllably degraded and/or bio-absorbed during the clinical deployment period, under in vivo conditions, to act as a potential source for transition metal chalcogenide species formation, having additional benefits as contemplated in this disclosure. The element proportions utilized in metal alloy formation can include specific phases observable in respective phase diagrams. Specific material compositions for manufacture of described implants can include for example:
  a) Pure Molybdenum of >99.999% purity
  b) Binary Molybdenum alloys further including:
     Molybdenum-Zinc alloys, including intermetallic phases $MoZn_7$, $MoZn_{22}$
     Molybdenum-Rhenium alloys, whereas Re is provided in a range of 5-41.0%
     Molybdenum-Tantalum alloys, whereas Ta is provided in a range of 1-11.0%
     Molybdenum-Niobium alloys
  c) Ternary transition metal alloys comprising:
     Magnesium, Zinc
     Niobium and Tantal Exemplary ternary transition metal alloy compositions that can exhibit transition metal chalcogenide formation capability include those formed from Magnesium, or Zinc, or Niobium in combination with Tantalum, and at least one element selected from the group consisting of Molybdenum, Tungsten, Vanadium or Rhenium. A variety of ternary metal alloy embodiments can be formed without limitation from about 5 to about 25 weight percent Niobium; about 0.1 to about 30 weight percent of at least one element selected from the group consisting of Molybdenum, Tungsten, Vanadium and Rhenium; and Tantalum. One such specific formulation can include 10% Nb, 7.5% W, and Ta (remaining %).

The transition metal and metal alloys can be provided in ingot form, after melt processing, extruded into tubing form of desired diameter, length and wall strength, and consecutively processed using conventional laser cutting techniques. Further surface modification may include a series of etching, mechanical and electrochemical polishing and passivation techniques, as concurrently utilized in the manufacture of stents. The in vivo absorption rate can be adjusted based on experimental determination and as required by the individual application. Molybdenum itself has been traditionally used for forming high-strength steel alloys and exhibits a high degree of corrosion resistance, thereby reasonably making it an ideal alloying agent for metals known to undergo rapid in vivo degradation for facilitating a controllable absorption rate. Such transition-metal derived implants can be utilized for many applications involving a substantial, non-permanent implantation period, which can include non-vascular and vascular medical implants, such as bioabsorbable stents, stent grafts, vascular scaffolds, umbrella devices, coils, clips and equivalents.

Example 42

Bioactivatable Wound-Care Dressing Matrices

EXAMPLE 42 provides embodiments for incorporating transition metal chalcogenides of Formula I into bioactivatable advanced wound care products.

Various articles and devices have been developed to manage the care and treatment of tissue injury or wounds. Wounds are susceptible to many secondary effects that occur after the initial tissue injury, including further mechanical trauma, scar tissue formation, hardening of healthy tissue, pathogenic infiltration, infection, dehydration, excessive fluid discharge, sepsis, inflammation, abscess formation, ulzeration, gangrene and/or tissue necrosis. The selection of an appropriate wound dressing to suit a specific type of tissue damage at a wound site can significantly promote the healing process with reduced secondary effects, including scar formation and pain. Many dressings can adhere to the surface of sensitive de novo epidermal layer, and can result in extensive tissue scarring when frequent changes in dressings may be required. Insufficient wound care can significantly reduce the healing rate, promote other secondary complications such as inflammation, infection, and induce additional discomfort and pain. High-performance wound dressings that can exhibit multi-functional properties are highly desirable to treat various types of human and animal wounds.

In various embodiments, the wound-care dressing matrices can incorporate transition metal chalcogenide species of Formula I as a coating layer disposed over a structural component of the wound dressing material, wherein the coating layer encapsulating the structural component can function at least as a tissue-contacting surface.

In various embodiments, the wound-care dressing matrices can incorporate transition metal chalcogenide species of Formula I, as a component that can be configured into various forms, including as fibrous/nonfibrous mats, porous/non-porous membranes, porous/non-porous films, open-cell/closed-cell foams, particulate formulations for spray-on applications, substantially soft, plastically and/or elastically deformable, free-flowing or setting formulations suitable as shapeable and tissue-conforming wound-dressings, coverings, gels, salves, ointments, the equivalent of these forms, and combinations thereof.

In various embodiments, the wound-care dressing matrices can incorporate transition metal chalcogenide species of Formula I that can be bound reversibly to a polymeric matrix by providing binding sites capable of entering a stabilizing interaction, such as through hydrogen bonding, coordination and ion-pair formation. Upon formation of a tissue-contacting surface, the transition metal species can be released from the polymeric matrix carrier and can subsequently diffuse into the treatment area for further, localized formation of a bioactive transition metal species in vivo to effect desirable beneficial effects.

Figure 12:
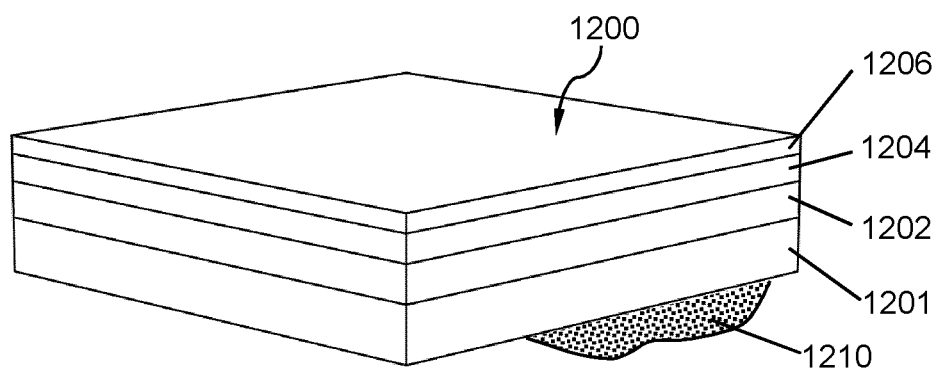
FIG. 12 is a schematic of a bioactivatable wound-care dressing matrix comprising multiple substrate layers, and formulated as adhesive wound patch, as one embodiment.

For further illustration, FIG. 12 is a schematic of a wound-care dressing matrix comprising multiple substrate layers, and formulated as adhesive wound patch, as one embodiment of the present disclosure. In FIG. 12, the wound dressing 1200 comprises at least three layers of substrate layers, a liquid-repellant, moisture permeable polymeric-derived top layer 1206, situated above a liquid absorbent hydrogel layer 1204, situated above an adhesive layer 1202, in which the substrate layers can be juxtaposed together in any manner, and can be produced by lamination, bonding, extrusion, electrospinning, spray-coating, or other established methods known to persons skilled in the art. The wound-care dressing matrix is shown disposed over a laceration 1210 and attached to the surrounding tissue 1201.

The hydrogel layer 1204 can be manufactured using the methodology described in EXAMPLE 9, or more specifically, EXAMPLE 10. Accordingly, when a cationic hydrogel is utilized in the construction of layer 1204, an anionic transition metal chalcogenide species of Formula I can be diffused into and ionically bound to the hydrogel layer for further release. If the anionic transition metal chalcogenide species is a tetrathiomolybdate $[MoS_4]^{2-}$, an anti-inflammatory action can reasonably be expected to occur by local release onto the site of treatment, whereas if a molybdate $[MoO_4]^{2-}$ species is utilized, an anti-bacterial action can be reasonably facilitated. If mixed species of the above are utilized, a range of anti-inflammatory and anti-infective properties may beneficially be obtained as desired for a given wound care application.

In various embodiments, the substrate layer comprising the tissue-contacting surface is one or more foam/sponges that can be fused together with other very absorbent, porous, and durable materials. The excess exudate can be removed from the wound site by at least the capillary structure of the tissue-contacting layer comprising transition metal chalcogenide species of Formula I when a negative pressure (a vacuum) is applied employing an external source, which can be a manually operated or an automated vacuum-producing pump or equivalents thereof. The wound dressing articles comprising transition metal chalcogenide formulations can be deployed ranging from a few hours up to one or more weeks.

Furthermore, additional bacteriostatic properties can be conferred by incorporating a mixed transition oxometallate species, for example, by enabling the slow oxidation of a transition metal chalcogenide such as $MoS_2$ under ambient conditions, or by directly providing a transition oxometallate species, such as a molybdate. Enhanced bacteriostatic properties can substantially reduce the risk, the onset, the spread, and the severity of bacterial infection and sepsis. The molybdenum species can exert anti-inflammatory and anti-proliferative activities when physiologically converted from the non-bioactive state to a bioactive state. The transition metal chalcogenide species can be provided in the form of a coating or a filling agent, and deposited by the various processes described in previous examples. Alternatively formulations can be provided ionically attached to a hydrogel film formed over the tissue-contacting interfacial regions of the implant. When embodied as a filling agent, dispersion may be further improved by surface modification of the particulate matter. As a device coating, further surface modification for example, through fluoropassivation may be provided to decrease adherence of exudate to the device.

Example 43

Bioactivatable Dental Implants

EXAMPLE 42 provides embodiments for incorporating transition metal chalcogenides of Formula I into bioactivatable dental implants. Dental implants are surgical components that can interface with the bone of the jaw or skull to support a dental prosthesis such as a fixture, crown, bridge, denture, facial prosthesis, or that can act as an orthodontic anchor. Once the implant has bonded to the jawbone, a small connector post or abutment can be attached to the post to securely hold, for example, a tooth prosthetic or crown.

Dental implantations can lead to a number of complications, including infiltration of periodontal pathogens and subsequent infection, extended gingival sulcus, peri-implantitis, a destructive inflammatory process affecting the soft and hard tissues surrounding dental implants, and tissue necrosis. Additionally, failure in osseointegration and bone loss over time can significantly impair implant stability over time, eventually causing implant failure.

Substantial performance improvements can be reasonably expected by incorporating material formulations comprising transition metal chalcogenides of Formula I into various bioactivatable dental implants. For example, bioactivatable dental implants comprising transition metal chalcogenides of Formula I can be effective in reducing the various inflammatory and proliferative activities triggered by the implantation procedure. The management of implant-induced inflammatory responses can substantially improve implant biocompatibility, acknowledged as a persistent challenge inherent to most invasive implants.

By incorporating a variable proportion of two or more transition metal chalcogenide species, with at least one having anti-inflammatory, another one having anti-bacterial properties, a balancing range of desirable anti-inflammatory and anti-bacterial therapeutic properties can be obtained. Mixed transition oxometallate species can be specifically formulated, for example by direct provision of a transition oxometallate species, such as a molybdate in combination with a transition thiometallate, such as tetrathiomolybdate, or naturally obtained through the oxidative susceptibility of the initially provided transition metal chalcogenide species, such as $MoS_2$, by environmental exposure under ambient conditions. Alternatively, specific oxothiometallate species can be selected and provided based on predictable metabolization kinetics and chemic equilibria, to effect a continuously changing or nearly constant therapeutic spectrum over time. An exemplary coating configuration having a substantially bacteriostatic outer layer comprising $MoO_3$ and a dormant, bioactivatable layer comprising $MoS_3$, to effect a variable therapeutic spectrum over time is provided in FIG. 4, whereas the configuration can be created according to the methodology described in EXAMPLE 2. When modified accordingly, an implant surface intended for endosseous tissue contact, particularly the orthodontic anchor portion of the device, can be rendered to exhibit anti-bacterial and anti-inflammatory properties at substantially the same, similar or different time phases following implantation and exposure to physiological environment.

In alternate arrangements, the implants can be modified with the same or different transition metal chalcogenide species at variable implant regions of interest to create localized anti-inflammatory and anti-bacterial properties, as desired. For example, one transition metal chalcogenide species can be provided as a filling agent incorporated into the crown or abutment portion of a composite dental implant, whereas the implant (anchoring) portion can be coated with another transition metal chalcogenide species, deposited by the various available processes described in previous examples. Other formulations can be provided ionically attached to a hydrogel film formed over the tissue contacting interfacial regions of the implant. When embodied as a filling agent, dispersion may further be improved by surface modification of the particulate matter.

In additional embodiments, the implants interfacial morphology, particularly the orthodontic anchor portion of the device, can further be provided selectively porosified as described in EXAMPLE 21 or EXAMPLE 22 and illustrated in FIG. 7 or FIG. 8, to effect variable degrees of cellular interaction, tissue in-growth and implant anchoring at desired implant regions of interest, to facilitate improved osseointegration and reduction of the gingival sulcus zone. The potential physical pathways for pathogen infiltration can be reduced and the long-term implant stability can be improved.

By incorporating an additional fluoropassivation top layer over the transition metal chalcogenide species, in analogy to foregoing descriptions and as illustrated by FIG. 3, implant integration can be enhanced. Fluoropassivation is known to be capable of inducing among other effects, selective absorption capability for albumin. Following implantation, selective formation of stable, albumin-enriched protein adsorbate layers on the implant surface can reduce pathogen infiltration capability, biofilm formation and the onset of bacterial infection. Subsequently, enhanced initial cell layer formation and proliferation capability at the implant-tissue interface can further improve soft tissue integration and enhance ingrowth of dental implants.

The foregoing description, for purposes of explanation, refers to specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and practical applications, to thereby enable others skilled in the art to best utilize the invention and various embodiments with various modifications as suitable for the particular uses contemplated. It is intended that the scope of the invention be defined by the following claims and their equivalent.

We claim:

1. A material composition suitable for use as a bioactivatable coating for an implantable medical device, said composition comprising one or more transition metal chalcogenides provided in a non-bioactive form that are converted into a charged bioactive form upon exposure to physiological conditions, wherein said one or more transition metal chalcogenides are defined by Formula I:

$$M_xA_yB_z \qquad \text{(Formula I)}$$

having an index number x, y, and z that each constitute a non-zero atomic ratio of the material composition in which:
  M is a transition metal element, further wherein M is molybdenum present in an atomic ratio x is 1 or 3;
  A is a first chalcogenide element, further wherein A is sulfur present in an atomic ratio y, which is greater than 0 and less than or equal to 9;

B is a second chalcogenide element selected from the group consisting of oxygen and selenium, further wherein B is present in an atomic ratio z, which is greater than 0 and less than or equal to 9; and wherein a sum of the atomic ratios y and z of the first and second chalcogenide elements A and B is non-stoichiometric and differs in a range from 0.01 to 20% from a corresponding stoichiometric sum that is sum defined as 2, 3, or 9, and wherein further, the material composition includes titanium, wherein an atomic ratio of Ti:M is in the range of 0.01 to 20%.

2. The material composition according to claim 1, wherein an atomic ratio of y:x ranges from 1.5 to 2.2.

3. The material composition according to claim 1, wherein the material composition is formed in multiple layers.

4. The material composition according to claim 3, wherein said multiple layers consecutively comprise: a bottom layer as an adhesion layer and a top layer that is fluoropassivated.

5. The material composition according to claim 1, wherein, in the context of a bioactivatable coating for an implantable medical device, said composition is capable of preventing or treating non-vascular and vascular diseases, selected from the group consisting of atherosclerosis; thrombosis; inflammation; infection; restenosis; angiogenesis, and tumor growth.

6. The material composition according to claim 1, wherein, under physiological conditions, said composition enables the local release of a non-bioactive transition metal species that is subsequently converted into a bioactive species, wherein said release ensures therapeutically effective concentration levels of said bioactive species over a duration sufficient to ensure long term therapeutic efficacy.

7. An implantable medical device having multiple layers of the material composition of claim 1 vapor deposited thereon.

8. The implantable medical device according to claim 7, wherein said medical device is selected from a group consisting of vascular, non-vascular, dental, and orthopedic implants; stents, covered stents, vascular scaffolds, and stent grafts; filters, peripheral access devices, coils, clips, fixtures, abutments, crowns, bridges, dentures, orthodontic anchors, bone anchors, screws, nails, plates, and articulating joint prosthetic components for vertebrae-, knee-, shoulder-, and hip prostheses.

9. The implantable medical device according to claim 7, wherein said device includes a structural support fabricated from one or more of titanium, tantalum, cobalt-chromium, nickel-titanium (Nitinol), or stainless-steel alloy.

10. The implantable medical device according to claim 7, wherein said multiple layers consecutively comprise (1) an adhesion promoting layer consisting of titanium, (2) one or more interlayers, wherein each interlayer consists of a mixture of titanium and said transition metal chalcogenide, further wherein the atomic ratio of Ti:M in said one or more interlayers ranges from 0.01 to 20%; and (3) a top layer consisting of said transition metal chalcogenide.

11. The implantable medical device according to claim 10, wherein the one or more interlayers between the adhesion promoting layer and the top layer, comprise a mixture of titanium and said transition metal chalcogenide.

12. The implantable medical device according to claim 11, wherein the Ti:M ratio in each consecutively deposited interlayer is decreased, from a maximum ratio of 20% to a minimum ratio of 0.01%.

* * * * *